United States Patent
Suzuki et al.

(10) Patent No.: US 11,377,568 B2
(45) Date of Patent: Jul. 5, 2022

(54) METAL SURFACE TREATMENT AGENT, METAL SURFACE TREATMENT METHOD, AND METAL MATERIAL

(71) Applicant: Nihon Parkerizing Co., Ltd., Tokyo (JP)

(72) Inventors: Amane Suzuki, Tokyo (JP); Tomohiro Iko, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 339 days.

(21) Appl. No.: 16/612,359

(22) PCT Filed: Aug. 30, 2017

(86) PCT No.: PCT/JP2017/031230
§ 371 (c)(1),
(2) Date: Nov. 8, 2019

(87) PCT Pub. No.: WO2018/207384
PCT Pub. Date: Nov. 15, 2018

(65) Prior Publication Data
US 2021/0155810 A1 May 27, 2021

(30) Foreign Application Priority Data
May 11, 2017 (JP) .............................. JP2017-095093

(51) Int. Cl.
*C09D 5/44* (2006.01)
*C09D 175/06* (2006.01)
*C09D 175/08* (2006.01)

(52) U.S. Cl.
CPC ......... *C09D 5/4465* (2013.01); *C09D 175/06* (2013.01); *C09D 175/08* (2013.01)

(58) Field of Classification Search
None
See application file for complete search history.

(56) References Cited

U.S. PATENT DOCUMENTS

2004/0062873 A1  4/2004  Jung et al.
2014/0190592 A1* 7/2014  Uchikawa ............... C23C 22/34
                                                          148/279

FOREIGN PATENT DOCUMENTS

CN      101048476 A    10/2007
JP      2009-041077     2/2009

OTHER PUBLICATIONS

Office Action in CN Application No. 201780090633.8 dated Mar. 3, 2021, 16 pages.
Search Report in International Application No. PCT/JP2017/031230 dated Oct. 3, 2017, 4 pages.
Extended European Search Report in EP Application No. 17909495.8 dated Feb. 4, 2021, 6 pages.
International Preliminary Report on Patentability and Written Opinion in International Application No. PCT/JP2017/031230 dated Nov. 21, 2019, 6 pages.

* cited by examiner

*Primary Examiner* — Jeffrey D Washville
(74) *Attorney, Agent, or Firm* — Marshall, Gerstein & Borun LLP

(57) ABSTRACT

The present invention addresses a problem of providing, for example, a metal surface treatment agent capable of forming a coating film that exhibits good corrosion resistance at edges, such as cut portions, of a coated metal material. The problem is solved by a metal surface treatment agent comprising: an ion (A) containing at least one kind of metal selected from zirconium, titanium and hafnium at a metal-equivalent molar concentration of 0.1 mmol/L or higher; and an aqueous urethane resin (B) having a weight-average molecular weight of 50,000 or higher at a solid mass concentration of 0.5 to 10 g/L, in which the ratio of a solid mass ($B_M$) of the resin (B) to a metal-equivalent mass ($A_M$) of the ion (A), [$B_M/A_M$], is 0.7 or higher.

5 Claims, No Drawings

METAL SURFACE TREATMENT AGENT, METAL SURFACE TREATMENT METHOD, AND METAL MATERIAL

TECHNICAL FIELD

The present invention relates to: a metal surface treatment agent; a metal surface treatment method using the metal surface treatment agent; and a metal material having a surface treatment coating layer that is obtained by the method.

BACKGROUND ART

Conventionally, in order to improve the corrosion resistance of a coated metal material, a variety of chemical conversion treatment agents and base treatment agents that are used in pretreatment of coating have been developed. For example, Patent Document 1 proposes a technology relating to a solution composition of a metal surface treatment agent containing zirconium as a main component.

RELATED ART DOCUMENT

Patent Document

[Patent Document 1] Japanese Unexamined Patent Application Publication No. 2009-41077

SUMMARY OF THE INVENTION

Problems to be Solved by the Invention

However, even when the surface of a metal material is treated with the solution composition disclosed in Patent Document 1 prior to being coated, the edges of the metal material do not always exhibit a sufficient corrosion resistance. Therefore, an object of the present invention is to provide: a metal surface treatment agent which is used in the pretreatment of coating and can impart excellent corrosion resistance to edges of a metal material when the metal material is coated; a metal surface treatment method using the metal surface treatment agent; and a metal material having a surface treatment coating layer that is obtained by the method.

Means for Solving the Problems

To solve the above-described problems, the present inventors did an intensive research and consequently discovered that good corrosion resistance can be attained at edges, such as cut portions of a metal material, by surface-treating the metal material with a metal surface treatment agent and subsequently coating the metal material, the metal surface treatment agent comprising: an ion (A) containing at least one kind of metal selected from zirconium, titanium and hafnium at a metal-equivalent molar concentration of 0.1 mmol/L or higher; and an aqueous urethane resin (B) having a weight-average molecular weight of 50,000 or higher at a solid mass concentration of 0.5 to 10 g/L, the ratio of a solid mass $(B_M)$ of the resin (B) to a metal-equivalent mass $(A_M)$ of the ion (A), $[B_M/A_M]$ is 0.7 or higher, thereby completing the present invention.

That is, the present invention provides the following (I) to (V).

(I) A metal surface treatment agent, comprising: an ion (A) containing at least one kind of metal selected from zirconium, titanium and hafnium at a metal-equivalent molar concentration of 0.1 mmol/L or higher; and an aqueous urethane resin (B) having a weight-average molecular weight of 50,000 or higher at a solid mass concentration of 0.5 to 10 g/L, wherein the ratio of a solid mass $(B_M)$ of the resin (B) to a metal-equivalent mass $(A_M)$ of the ion (A), $[B_M/A_M]$ is 0.7 or higher.

(II) The metal surface treatment agent according to the above (I), further containing at least one kind of metal (C) selected from aluminum, magnesium, zinc, and iron.

(III) The metal surface treatment agent according to the above (I) or (II), further containing at least one kind of acid radical (E) selected from nitric acid radical, sulfuric acid radical, formic acid radical, acetic acid radical, and alkanesulfonic acid radical.

(IV) A metal surface treatment method, including the step of bringing the metal surface treatment agent according to any one of the above (I) to (III) into contact with a metal surface.

(V) A metal material, having a surface treatment coating layer formed on/over the surface of the metal material by the surface treatment method according to the above (IV).

Effects of the Invention

According to the present invention, a metal surface treatment agent which is used for a pretreatment of coating and can impart excellent corrosion resistance to edges of a metal material, such as its cut portions, when the metal material is coated, a metal surface treatment method using the metal surface treatment agent, and a metal material having a surface treatment coating layer that is obtained by the method can be provided.

EMBODIMENTS

The following describes a metal surface treatment agent according to an embodiment of the present invention, a metal surface treatment method using the metal surface treatment agent, and a metal material having a surface treatment coating layer that is obtained by the method in detail. It is noted here that the present invention can be modified as desired as well as within a range not departing from the gist of the present invention, and is not restricted to the below-described embodiments.

[Metal Surface Treatment Agent]

A metal surface treatment agent according to the embodiments of the present invention ("treatment agent" in short in the following text) is used in the pretreatment of coating. A surface treatment coating layer can be formed by treating a metal surface with this metal surface treatment agent. By performing coating on/over the surface treatment coating layer, good corrosion resistance can be attained also at edges, such as cut portions and punched-out portions of a metal material.

The treatment agent of the present embodiment comprising: an ion (A) containing at least one kind of metal selected from zirconium, titanium and hafnium at a metal-equivalent molar concentration of 0.1 mmol/L or higher; and an aqueous urethane resin (B) having a weight-average molecular weight of 50,000 or higher at a solid mass concentration of 0.5 to 10 g/L, the ratio of a solid mass $(B_M)$ of the resin (B) to a metal-equivalent mass $(A_M)$ of the ion (A), $[B_M/A_M]$, is 0.7 or higher.

The treatment agent of the present embodiment may further contain metal (C) selected from aluminum, magnesium, zinc, and iron.

The treatment agent of the present embodiment may also further contain at least one kind of acid radical (E) selected from nitric acid radical, sulfuric acid radical, a formic acid radical, acetic acid radical, and alkanesulfonic acid radical.

The above ion (A) is an ion containing at least one kind of metal selected from zirconium, titanium and hafnium. This metal-containing ion is not particularly restricted, and examples thereof include metal ions, such as zirconium ion, titanium ion, and hafnium ion; complex ions containing zirconium, titanium, or hafnium; and oxide ions of zirconium, titanium, or hafnium. In the metal surface treatment agent of the present embodiment, any one of these ions may be contained, or two or more thereof may be contained. A supply source of the ion (A) is not particularly restricted as long as it is capable of forming the above-described various ions, and examples thereof include zirconium, titanium, hafnium, zirconium sulfate, zirconium oxysulfate, zirconium ammonium sulfate, zirconium oxynitrate, zirconium ammonium nitrate, hexafluorozirconic acid, hexafluorozirconium complex salts, titanium sulfate, titanium oxysulfate, titanium ammonium sulfate, titanium nitrate, titanium oxynitrate, titanium ammonium nitrate, hexafluorotitanic acid, hexafluorotitanium complex salts, hexafluorohafnic acid, and hexafluorohafnates.

In the treatment agent of the present embodiment, the content of the ion (A) is preferably 0.1 mmol/L or higher, more preferably 0.4 mmol/L or higher, in terms of metal-equivalent molar concentration. The upper limit thereof is not particularly restricted; however, from the cost standpoint, it is preferably 100 mmol/L or less.

The weight-average molecular weight of the aqueous urethane resin (B) ("resin (B)" in short in the following text) can be 50,000 or higher, and preferably 100,000 or higher, more preferably 500,000 or higher, further more preferably 1,000,000 or higher. The upper limit of the weight-average molecular weight is not particularly restricted; however, it is usually 3,000,000 or less. The weight-average molecular weight of the resin (B) is analyzed by GPC (gel permeation chromatography) and means a value determined as polyethylene glycol-equivalent weight-average molecular weight. The analysis conditions of GPC are as follows.

Measuring apparatus: HLC-8320GPC EcoSEC, manufactured by Tosoh Corporation

Column: two connected TSKgel α-M columns

Mobile phase: dimethylformamide/0.06M LiBr/0.04M $H_3PO_3$

Temperature: column thermostat bath at 40° C.

Flow rate of mobile phase: 0.5 ml/min

The resin (B) can be typically obtained from reaction between a urethane prepolymer and water. In this process, in order to facilitate the reaction, a polyamine compound other than a tertiary amine compound, which is a chain extender, may be incorporated as required. Specifically, isocyanate groups contained in the urethane prepolymer react with an amine generated by reaction between the isocyanate group and water, or with amino groups contained in the polyamine compound incorporated as required, to form urea bonds, whereby a urethane resin is produced.

The urethane prepolymer is a component used in the production of the resin (B), and the structure thereof is not particularly restricted; however, the urethane prepolymer preferably contains a polyisocyanate-derived structural unit having a cyclohexane ring structure, which is represented by the following Formula (1).

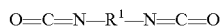   Formula (1):

In Formula (1), $R^1$ is represented by $—R^2—R^3—R^4—$, $R^2$ represents a single bond or an alkylene group, $R^3$ is represented by

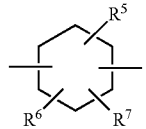

(wherein, $R^5$, $R^6$ and $R^7$ independently represent a hydrogen atom or an alkyl group), and $R^4$ represents

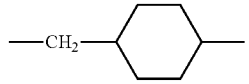

a single bond, an alkylene group, or (the bond on the left side is bonded to $R^3$).

$R^1$ is preferably

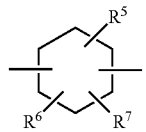

(wherein, $R^5$, $R^6$ and $R^7$ independently represent a hydrogen atom or a methyl group),

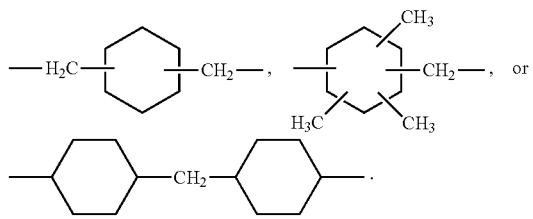

In the above formulae, all of $R^5$, $R^6$ and $R^7$ are preferably hydrogen atoms or methyl groups.

When a polyisocyanate represented by the above-described Formula (1) is used in the urethane prepolymer production, the amount thereof to be added is preferably 20 to 80% by mass, more preferably 30 to 70% by mass, further more preferably 40 to 65% by mass, particularly preferably 50 to 60% by mass, with respect to a total amount of raw materials used in the urethane prepolymer production. In other words, in the resin (B), the polyisocyanate-derived structural unit represented by Formula (1) exists in an amount (in terms of mass) of preferably 20 to 80%, more preferably 30 to 70%, further more preferably 40 to 65%, particularly preferably 50 to 60%.

The polyisocyanate is not particularly restricted as long as it is a polyisocyanate represented by Formula (1) which has one or more cyclohexane rings and two or more isocyanate groups, and examples thereof include isophorone diisocyanate, 1,3- or 1,4-bis(isocyanatomethyl)cyclohexane, 1,3- or 1,4-diisocyanatecyclohexane, 3-isocyanate-methyl-3,5,5-trimethylcyclohexyl isocyanate, and dicyclohexylmethane-4,4'-diisocyanate.

For example, a dimer such as a uretdione structure that is a polyisocyanate not included in Formula (1), a trimer such as an isocyanurate structure, or a polyisocyanate having three or more isocyanate groups in one molecule as an adduct using a polyfunctional polyol may be used in combination of the polyisocyanate represented by Formula (1).

The polyisocyanate may be used singly, or two or more thereof may be used in combination.

Further, the urethane prepolymer contains a diol-derived structural unit in addition to the polyisocyanate-derived structural unit that is represented by Formula (1) and has a cyclohexane ring structure. Examples of the diol-derived structural unit include structural units derived from diols represented by the below-described Formula (2), (3), (4) or the like. It is noted here that a diol represented by Formula (2), a diol represented by Formula (3) and a diol represented by Formula (4) may be hereinafter referred to as "polyol", "first diol" and "second diol", respectively.

Formula (2):

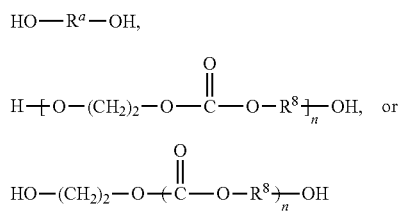

(n represents an integer)

In Formula (2), $R^8$ is represented by $—R^9—R^{10}—R^{11}—$, $R^9$ represents a single bond,

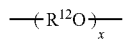

(the bond on the right side is bonded to $R^{10}$), or $—R^{13}—CO—$ (the bond on the right side is bonded to $R^{10}$), wherein, $R^{12}$ represents a linear or branched alkylene group; $R^{13}$ represents $—R^{18}—O—$ (the bond on the right side is bonded to CO), or

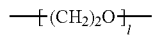

(the bond on the right side is bonded to CO). And, $R^{18}$ represents a linear or branched alkylene group; x represents an integer of 1 to 5; l represents an integer of 2 to 4, $R^{10}$ represents

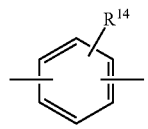

$R^{11}$ represents a single bond,

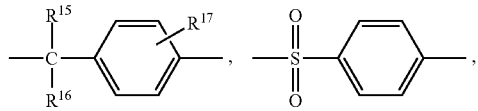

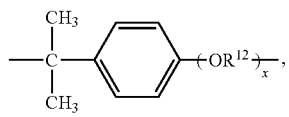

or $—CO—R^{13}—$ (excluding the single bond, the bond on the left is bonded to $R^{10}$), wherein, $R^{12}$ represents a linear or branched alkylene group; $R^{13}$ represents $—R^{18}—O—$ (the bond on the right side is bonded to CO), or

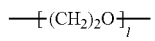

(the bond on the right side is bonded to CO); $R^{15}$ and $R^{16}$ independently represent a hydrogen atom, an alkyl group, a halogenated alkyl group, or a phenyl group; $R^{17}$ represents a hydrogen atom, an alkyl group, or a phenyl group; $R^{18}$ represents a linear or branched alkylene group; x represents an integer of 1 to 5; and l represents an integer of 2 to 4.

$R^{11}$ represents a hydrogen atom, an alkyl group, a phenyl group, or

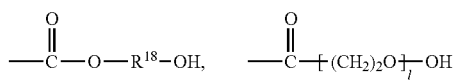

(wherein, $R^{18}$ represents a linear or branched alkylene group; and l represents an integer of 2 to 4).

$R^8$ is preferably

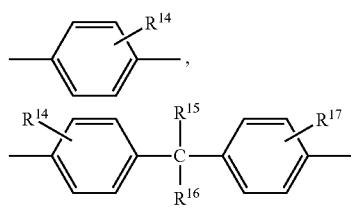

(the bond on the right side is bonded to OH),

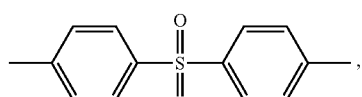

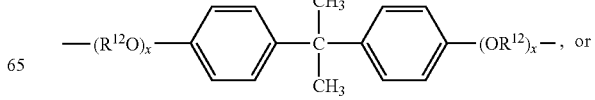

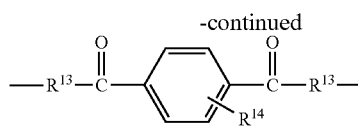

$R^{12}$ is preferably an ethylene group or an isopropylene group. $R^{14}$ is preferably a hydrogen atom, a methyl group, an isopropyl group, or a phenyl group. $R^{15}$ is preferably a hydrogen atom, a methyl group, a trifluoromethyl group, or a phenyl group. $R^{16}$ is preferably a hydrogen atom, a methyl group, an ethyl group, a trifluoromethyl group, or a phenyl group. $R^{17}$ is preferably a hydrogen atom, a methyl group, an isopropyl group, or a phenyl group.

Formula (3): HO—$R^{19}$—H    (3)

In Formula (3), $R^{19}$ represents

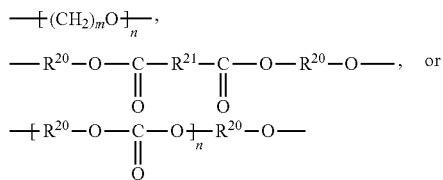

(each bond on the left side is bonded to OH),
(wherein, $R^{20}$s independently represent an alkylene group,

or an adamantane ring; $R^{21}$ represents an alkylene group; m represents an integer of 2 to 4; and n represents an integer).

HO—$R^{22}$—OH    Formula (4):

In Formula (4), $R^{22}$ represents
an alkylene group,

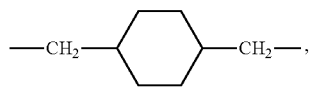

an adamantane ring,

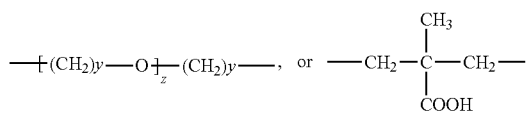

(wherein, y represents 2 or 3, and z represents an integer of 1 to 6).

The urethane polymer preferably contains structural units derived from the polyol and the first diol, structural units derived from the polyol and the second diol, structural units derived from the first and the second diols, or structural units derived from the polyol and the first and the second diols, in addition to the polyisocyanate-derived structural unit that is represented by Formula (1) and has a cyclohexane ring structure.

In the urethane prepolymer production, when the first diol and the second diol are used in combination, the first diol preferably has a weight-average molecular weight higher than 600, while the second diol preferably has a weight-average molecular weight of 600 or less. The weight-average molecular weight of the first diol may be higher than 600, higher than 600 while 10,000 or less, higher than 600 while 5,000 or less, 800 to 4,000, or 1,000 to 3,000. Further, the weight-average molecular weight of the second diol may be 600 or less, 500 or less, 400 or less, or 250 or less. At the same time, the lower limit value thereof may be 60 or higher, or 100 or higher.

The weight-average molecular weights of the respective components in the present embodiment are each, unless otherwise specified, a value that is measured by GPC (gel permeation chromatography) and converted in terms of polystyrene in the same manner as the measurement of the weight-average molecular weight of the resin (B).

The polyol is not particularly restricted as long as it is a polyol represented by Formula (2) which has one or more benzene rings and two or more hydroxy groups while does not have a nitrogen atom, and examples thereof include aromatic polyols, such as resorcinol, 2-methyl resorcinol, bisphenol A, bisphenol S, and bisphenol F; benzene ring-containing polyether polyols, such as bisphenol A-ethylene oxide 2-mol adduct, bisphenol A-ethylene oxide 4-mol adduct, bisphenol A-ethylene oxide 6-mol adduct, bisphenol A-ethylene oxide 10-mol adduct, bisphenol A-propylene oxide 2-mol adduct, bisphenol A-propylene oxide 4-mol adduct, bisphenol A-propylene oxide 6-mol adduct, and bisphenol A-propylene oxide 10-mol adduct; benzene ring-containing polyester polyols obtained by polycondensation of an aromatic polycarboxylic acid, such as phthalic acid, isophthalic acid, terephthalic acid or trimellitic acid, and a polyol, such as ethylene glycol, propylene glycol, diethylene glycol, triethylene glycol, tetraethylene glycol, 2-methylpropanediol, neopentyl glycol, 1,4-butanediol, 1,5-pentanediol, 1,6-hexanediol or 3-methylpentanediol; and benzene ring-containing polycarbonate polyols obtained by a transesterification reaction between ethylene carbonate and a polyol such as bisphenol A.

These polyols may be used singly, or in combination of two or more thereof.

As the first diol, for example, a polyether diol, a polyester diol, or a polycarbonate diol can be used.

Examples of the polyether diol include polyethylene glycol, polypropylene glycol, and polybutylene glycol (polytetramethylene ether glycol). The polyether diol is produced by, for example, addition polymerization of an alkylene oxide, such as ethylene oxide or propylene oxide, in the presence of a basic catalyst.

Examples of the polyester diol include those produced by an esterification reaction between acid species and alcohol species acid species can be an aliphatic dicarboxylic acid (e.g., malonic acid, succinic acid, glutaric acid, adipic acid, or pimelic acid) or an unsaturated carboxylic acid (e.g., sebacic acid), while an alcohol species can be ethylene glycol, propylene glycol, tetraethylene glycol, 1,5-pentanediol, 1,6-hexanediol, 1,7-heptanediol, 1,8-octanediol, 1,9-nonanediol, 1,10-decanediol, neopentyl glycol, 2-methyl-1,3-propanediol, 3-methyl-1,5-pentanediol, cyclohexyl dimethanol, or 1,3-adamantanediol.

Examples of the above polycarbonate diol include those produced by ring-opening polymerization of a cyclic ester such as ε-caprolactone with a glycol, specifically those produced by a reaction between dimethyl carbonate, diethyl carbonate, diphenyl carbonate or the like and any of the alcohol species exemplified above for the polyester diol.

These first diols may be used singly, or in combination of two or more thereof.

Examples of the second diol include alkyldiols, such as ethylene glycol (62.07 g/mol), propylene glycol (76.09 g/mol), 1,5-pentanediol (104.15 g/mol), 1,6-hexanediol (118.17 g/mol), 1,7-heptanediol (132.2 g/mol), 1,8-octanediol (146.23 g/mol), 1,9-nonanediol (160.25 g/mol), 1,10-decanediol (174.28 g/mol), neopentyl glycol (104.15 g/mol), 2-methyl-1,3-propanediol (90.12 g/mol), 3-methyl-1,5-pentanediol (118.17 g/mol), 1,4-cyclohexyl dimethanol (146.14 g/mol), and 1,3-adamantanediol (168.23 g/mol); polyalkylene glycols, such as diethylene glycol (106.12 g/mol), triethylene glycol (150.17 g/mol), tetraethylene glycol (194.23 g/mol), pentaethylene glycol (238.28 g/mol), hexaethylene glycol (282.33 g/mol), heptaethylene glycol (323.28 g/mol), and dipropylene glycol (134.17 g/mol); and dimethylolpropionic acid (134 g/mol). These second diols may be used singly, or in combination of two or more thereof.

In the urethane prepolymer production, the amount of the diols (including the polyol) to be added may be, for example, usually 1 to 80% by mass, preferably 2 to 70% by mass, more preferably 3 to 60% by mass, further more preferably 6 to 50% by mass, with respect to a total amount of raw materials used in the urethane prepolymer production. In other words, in the resin (B), the diol-derived structural unit exists in an amount (in terms of mass) of preferably 1 to 80%, more preferably 2 to 70%, further more preferably 3 to 60%, particularly preferably 6 to 50%.

When a polyol is used in the urethane prepolymer production, the amount thereof to be added may be, for example, usually 1 to 40% by mass, preferably 1 to 30% by mass, more preferably 3 to 25% by mass, further more preferably 6 to 20% by mass, with respect to a total amount of raw materials used in the urethane prepolymer production. In other words, in the resin (B), a polyol-derived structural unit exists in an amount (in terms of mass) of usually 1 to 40%, preferably 1 to 30%, more preferably 3 to 25%, further more preferably 6 to 20%.

When a first diol is used in the urethane prepolymer production, the amount thereof to be added may be, for example, usually 1 to 50% by mass, preferably 3 to 40% by mass, more preferably 5 to 35% by mass, further more preferably 10 to 30% by mass, with respect to a total amount of raw materials used in the urethane prepolymer production. In other words, in the resin (B), a first diol-derived structural unit exists in an amount (in terms of mass) of usually 1 to 50%, preferably 3 to 40%, more preferably 5 to 35%, further more preferably 10 to 30%.

When a second diol is used in the urethane prepolymer production, the amount thereof to be added may be, for example, usually 1 to 25% by mass, preferably 1 to 20% by mass, more preferably 2 to 15% by mass, further more preferably 3 to 10% by mass, with respect to a total amount of raw materials used in the urethane prepolymer production. In other words, in the resin (B) used in the present embodiment, a second diol-derived structural unit exists in an amount (in terms of mass) of usually 1 to 25%, preferably 1 to 20%, more preferably 2 to 15%, further more preferably 3 to 10%.

Moreover, the urethane prepolymer preferably contains a structural unit derived from a tertiary amine compound (hereinafter, may be "tertiary amine" in short) and/or a salt thereof, which is represented by the following Formula (5), in addition to the above-described polyisocyanate-derived structural unit having a cyclohexane ring structure and the above-described diol-derived structural unit.

Formula (5):

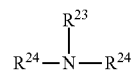

(wherein, $R^{23}$ represents an alkyl group, an aminoalkyl group, a hydroxyalkyl group,

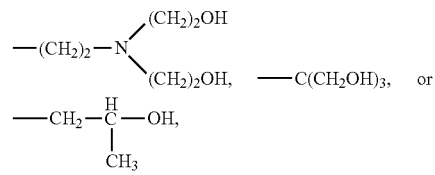

$R^{24}$ represents a hydroxyalkyl group, an aminoalkyl group, or an N-alkylaminoalkyl group).

The aminoalkyl group represented by $R^{23}$ is preferably —$(CH_2)_2$—$NH_2$ or —$(CH_2)_3$—$NH_2$. The aminoalkyl group represented by $R^{24}$ is preferably —$(CH_2)_2$—$NH_2$. The hydroxyalkyl groups represented by $R^{23}$ and $R^{24}$ are each preferably —$(CH_2)_2$—OH. The N-alkylaminoalkyl group represented by $R^{24}$ is preferably —$(CH_2)_2$—NH—$CH_3$.

Active hydrogens of a tertiary amine compound and/or a salt thereof react with the above-described polyisocyanate, whereby a urethane prepolymer (urethane resin) into which a group derived from the tertiary amine compound and/or the salt thereof is obtained. The tertiary amine compound and/or the salt thereof contain two or more active hydrogens, preferably two or more active hydrogen-containing substituents, such as an amino group, a hydroxy group, and an N-alkylamino group. As the N-alkylamino group, a 2-methylamino group is preferred.

When a tertiary amine compound and/or a salt thereof is/are used in the urethane prepolymer production, the amount thereof to be added may be, for example, usually 1 to 20% by mass, preferably 2 to 15% by mass, more preferably 2 to 13% by mass, further more preferably 3 to 10% by mass, with respect to a total amount of raw materials used in the urethane prepolymer production. In other words, in the resin (B), a structural unit derived from a tertiary amine compound and/or a salt thereof exists in an amount (in terms of mass) of usually 1 to 20%, preferably 2 to 15%, more preferably 2 to 13%, still more preferably 3 to 10%.

With the added amount of the tertiary amine compound and/or the salt thereof in the above-described range, the alkali resistance of the resulting urethane resin film tends to be further improved.

(Types of Tertiary Amine Compound)

The tertiary amine compound is not particularly restricted as long as it is a tertiary amine having two or more active hydrogens, and examples thereof include N-aminoalkyl dialkanolamines, such as N-methyl diethanolamine, N-ethyl diethanolamine, N-butyl diethanolamine, N-t-butyl diethanolamine, and N-(3-aminopropyl) diethanolamine; trialkanolamines optionally having a substituent, such as triethanolamine, N,N,N',N'-tetrakis(2-hydroxyethyl) ethylenediamine, bis(2-hydroxyethyl)aminotris (hydroxymethyl)methane, and 1-[bis(2-hydroxyethyl) amino]-2-propanol; and tertiary amine compounds, such as 2,2'-diamino-N-methyldiethylamine, N,N',N"-trimethyldiethylenetriamine, and tris(2-aminoethyl)amine. These tertiary amine compounds may each be used in the form of a salt with an organic acid such as formic acid or acetic acid, or an inorganic acid such as hydrochloric acid or sulfuric acid, or may be used in the form of being quaternized with an alkylating agent, such as dimethyl sulfate, diethyl sulfate or methyl iodide. As a tertiary amine compound, an N-aminoalkyl dialkanolamine, particularly N-methyl diethanolamine is preferable.

In the resin (B) of the present embodiment, a tertiary amine compound-derived structural moiety (tertiary amine) may be partially or entirely neutralized with an acid or the like. Examples of the acid used in this case include organic acids, for example, organic carboxylic acids such as formic acid, acetic acid, propionic acid, butyric acid, lactic acid, tartaric acid, malic acid, malonic acid and adipic acid, and organic sulfonic acids, such as methanesulfonic acid, ethanesulfonic acid and trifluoromethanesulfonic acid; and inorganic acids, such as hydrochloric acid, sulfuric acid, nitric acid, hydrofluoric acid, bromic acid, and phosphoric acid. These acids may be used singly, or in combination of two or more thereof.

Further, in the resin (B), a tertiary amine compound-derived structural moiety (tertiary amine) may be partially or entirely quaternized. Specific examples of a quaternizing agent used for quaternization include sulfuric acid esters, such as dimethyl sulfate and diethyl sulfate; alkyl halides, such as methyl chloride, benzyl chloride, methyl bromide, benzyl bromide, and methyl iodide; and carbonic acid esters, such as dimethyl carbonate and diethyl carbonate. These quaternizing agents may be used singly, or in combination of two or more thereof. Moreover, an acid as a neutralizer and a quaternizing agent may be used in combination as well.

It is noted here that, in the present specification, these acids and quaternizing agents may each be referred to as "ionizing agent".

In the present specification, an "alkyl group" or an "alkyl group" contained in a halogenated alkyl group, an aminoalkyl group, a hydroxyalkyl group, an N-alkylaminoalkyl group or the like is not particularly restricted. It is usually an alkyl group having not more than 20 carbon atoms and may be an alkyl group having not more than 12 carbon atoms, or an alkyl group having not more than 6 carbon atoms. Typical examples thereof include a methyl group, an ethyl group, a propyl group, an isopropyl group, a butyl group, an isobutyl group, a tert-butyl group, a sec-butyl group, a pentyl group, an isopentyl group, a neopentyl group, a hexyl group, an isohexyl group, a 3-methylpentyl group, a heptyl group, an octyl group, a nonyl group, a decyl group, an undecyl group, and a dodecyl group.

Further, an "alkylene group" is also not particularly restricted, and it is usually an alkylene group having not more than 20 carbon atoms and may be an alkylene group having not more than 12 carbon atoms, or an alkylene group having not more than 6 carbon atoms. Typical examples thereof include an ethylene group, a propylene group, a butylene group, an isobutylene group, a tert-butylene group, a sec-butylene group, a pentylene group, an isopentylene group, a neopentylene group, a hexylene group, an isohexylene group, a 3-methylpentylene group, a heptylene group, an octylene group, a nonylene group, a decylene group, an undecylene group, and a dodecylene group.

Examples of a halogenated alkyl group include the above-exemplified alkyl groups in which at least one hydrogen atom is substituted with a fluorine atom, a chlorine atom, a bromine atom, or an iodine atom.

In the production of the urethane prepolymer of the present embodiment, component(s) other than the above-described ones may be used as well. Examples of such other components include polyisocyanate other than the above-described polyisocyanates; a polyol other than the above-described polyols, which contains neither a benzene ring nor a nitrogen atom; an organic solvent; a polyamine compound other than tertiary amines; an ionizing agent; an acid; and an organic metal compound.

The polyisocyanate other than the above-described polyisocyanates is not particularly restricted, and examples thereof include aliphatic diisocyanates, such as 1,4-tetramethylene diisocyanate, ethyl(2,6-diisocyanate)hexanoate, 1,6-hexamethylene diisocyanate, 1,12-dodecamethylene diisocyanate, and 2,2,4- or 2,4,4-trimethylhexamethylene diisocyanate;

aromatic diisocyanates, such as m- or p-phenylene diisocyanate, tolylene-2,4-diisocyanate, tolylene-2,6-diisocyanate, diphenylmethane-4,4'-diisocyanate, 1,3-bis(2-isocyanato-2-propyl)benzene, naphthalene-1,5-diisocyanate, diphenyl-4,4'-diisocyanate, 4,4'-diisocyanate-3,3'-dimethyldiphenyl, 3-methyl-diphenylmethane-4,4'-diisocyanate, diphenyl ether-4,4'-diisocyanate, and tetramethylxylylene diisocyanate;

aliphatic triisocyanates, such as 1,3,6-hexamethylene triisocyanate, 1,8-diisocyanate-4-isocyanatemethyloctane, and 2-isocyanatoethyl(2,6-diisocyanate) hexanoate; and aromatic triisocyanates, such as triphenylmethane triisocyanate and tris(isocyanatephenyl)thiophosphate.

The polyisocyanate other than the above-described polyisocyanates may be, for example, a dimer such as a uretdione structure, a trimer such as an isocyanurate structure, or a polyisocyanate having three or more isocyanate groups in one molecule as an adduct using a polyfunctional polyol.

As the polyol other than the above-described polyols, a tri- or higher functional polyol containing neither a benzene ring nor a nitrogen atom can be used, and examples of such a polyol include trimethylolpropane, pentaerythritol.

In the production of the urethane prepolymer and/or the production of the urethane resin (B), an organic solvent may be used. The organic solvent is used as a solvent for allowing the above-described components to react with each other. The organic solvent is not particularly restricted, and examples thereof include ketone solvents, such as acetone, methyl ethyl ketone, and methyl isobutyl ketone; ester solvents, such as ethyl acetate and butyl acetate; ether solvents, such as tetrahydrofuran and 1,4-dioxane; nitrile-based solvents, such as acetonitrile and acrylonitrile; acrylate-based solvents, such as methyl acrylate, ethyl acrylate, methyl methacrylate, and ethyl methacrylate; amide solvents, such as dimethylformamide, dimethylacetamide, N-methylpyrrolidone, and N-ethylpyrrolidone; and sulfoxide solvents, such as dimethyl sulfoxide. From the standpoint of reducing the environmental burden, these organic solvents may be removed by vacuum distillation as required after the production of the urethane prepolymer or the urethane resin (B).

For the production of the urethane prepolymer and the resin (B), a known method can be applied. Examples thereof (Production Methods 1 to 6) are described below.

(Production Method 1)

A method where a urethane prepolymer is prepared by dissolving a polyisocyanate, a diol and, as required, a tertiary amine in an organic solvent and allowing these materials to react with each other, followed by, as required, ionization of a part or the entirety of the tertiary amine contained in the thus obtained urethane prepolymer with an ionizing agent, and emulsification of the urethane prepolymer by adding water.
(Production Method 2)

A method where a urethane prepolymer is prepared by dissolving a polyisocyanate, a diol and, as required, a tertiary amine in an organic solvent and allowing these materials to react with each other, followed by, as required, ionization of a part or the entirety of the tertiary amine contained in the thus obtained urethane prepolymer with an ionizing agent, and emulsification of the urethane prepolymer by adding while performing chain extension using a chain extender, such as a polyamine compound.
(Production Method 3)

A method where a urethane prepolymer is prepared by allowing a polyisocyanate, a diol and, as required, a tertiary amine and the like to react with each other without using an organic solvent (bulk polymerization method), followed by, as required, quaternization of a part or the entirety of the tertiary amine contained in the thus obtained urethane prepolymer with an ionizing agent, and emulsification of the urethane prepolymer by adding water.
(Production Method 4)

A method where a urethane prepolymer is prepared by ionizing a tertiary amine with an acid or an alkylating agent and subsequently adding thereto a polyisocyanate, a diol and the like and allowing these materials to react with each other, followed by, as required, ionization of a part or the entirety of the tertiary amine contained in the thus obtained urethane prepolymer with an ionizing agent, and emulsification of the urethane prepolymer by adding water.
(Production Method 5)

A method where a urethane prepolymer having a tertiary amine structure as a terminal moiety is prepared by adding and allowing a polyisocyanate, a diol and the like to react with each other in an organic solvent and further adding thereto a tertiary amine as required, followed by, as required, ionization of a part or the entirety of the tertiary amine contained in the thus obtained urethane prepolymer with an ionizing agent, and emulsification of the urethane prepolymer by adding water.
(Production Method 6)

A method where a urethane prepolymer having a tertiary amine structure as a terminal moiety is prepared by adding and allowing a polyisocyanate, a diol and the like to react with each other in an organic solvent and further adding thereto a tertiary amine as required, followed by, as required, ionization of a part or the entirety of the tertiary amine contained in the thus obtained urethane prepolymer with an ionizing agent, and emulsification of the urethane prepolymer by adding water while performing chain extension using a chain extender, such as a polyamine compound.

In the above-described Production Methods 1 to 6, a known emulsifier may be used.

Examples of a polyamine compound that can be used as the chain extender include ethylenediamine, 1,2-propanediamine, 1,6-hexamethylenediamine, piperazine, 2,5-dimethylpiperazine, isophorone diamine, 4,4'-dicyclohexylmethanediamine, 3,3'-dimethyl-4,4'-dicyclohexylmethanediamine, 1,4-cyclohexanediamine, 1,3-bisaminomethylcyclohexane, 2-aminoethylaminopropyl trimethoxysilane, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, hydrazine, 1,6-hexamethylene bishydrazine, succinic acid dihydrazide, adipic acid dihydrazide, glutaric acid dihydrazide, sebacic acid dihydrazide, isophthalic acid dihydrazide, β-semicarbazide propionic acid hydrazide, 3-semicarbazide propyl carbazate, and semicarbazide-3-semicarbazidemethyl-3,5,5-trimethylcyclohexane. Among these, hydrazine or ethylenediamine is preferably used.

When a chain extender is used, a polyamine compound is added in an amount of preferably 0.1 to 10 parts by mass, more preferably 0.2 to 5 parts by mass, with respect to 100 parts by mass of the urethane prepolymer.

From the standpoint of corrosion resistance, the resin (B) obtained in the above-described manner has an amine value of preferably 5 to 60 mg KOH/g, more preferably 8 to 30 mg KOH/g.

Further, in the metal surface treatment agent of the present embodiment, the content of the resin (B) is 0.5 to 10 g/L in terms of solid mass concentration. From the standpoint of corrosion resistance, the content of the resin (B) is preferably 0.5 to 5 g/L in terms of solid mass concentration.

In the metal surface treatment agent of the present embodiment, the ratio of a solid mass ($B_M$) of the resin (B) to a metal-equivalent mass ($A_M$) of the above ion (A), [$B_M/A_M$], is preferably 0.7 or higher. The upper limit thereof is not particularly restricted; however, it is usually 100 or lower.

The metal surface treatment agent of the present embodiment preferably further contains at least one kind of metal (C) selected from aluminum, magnesium, zinc, and iron. The form of this metal (C) can be any form like compound, ion, complex ion and the like. A supply source of the metal (C) is not particularly restricted, and examples thereof include aluminum nitrate, aluminum sulfate, aluminum fluoride, aluminum oxide, magnesium nitrate, magnesium sulfate, magnesium fluoride, zinc oxide, zinc nitrate, zinc sulfate, zinc chloride, iron nitrate, iron sulfate, and iron chloride. These supply sources may be used singly, or in combination of two or more thereof. The metal (C) may be intentionally incorporated into the metal surface treatment agent, or may be unavoidably mixed into the metal surface treatment agent.

The content of the metal (C) is preferably 20 mmol/L or less, more preferably 10 mmol/L or less, in terms of metal-equivalent molar concentration. The lower limit of the content of the metal (C) is not particularly restricted; however, it is usually 0.1 mmol/L or higher.

The metal surface treatment agent of the present embodiment preferably further contains at least one kind of acid radical (E) selected from a nitric acid radical, a sulfuric acid radical, a formic acid radical, an acetic acid radical, and an alkanesulfonic acid radical. The content of the acid radical (E) is preferably 10 to 2,000 mmol/L. Examples of the alkanesulfonic acid radical include R—SO$_3$— (wherein, R represents an alkyl group or a hydroxyalkyl group). The alkyl group is not particularly restricted; however, it is preferably a 01-20 alkyl group, more preferably a 01-4 alkyl group. An alkanesulfonate ion is not particularly restricted, and examples thereof include a methanesulfonate ion and an ethanesulfonate ion. Supply sources [acid components capable of forming the acid radical (E)] of the nitric acid radical, sulfuric acid radical, formic acid radical, acetic acid radical and alkanesulfonic acid radical are not particularly restricted as long as they can provide these acid radicals when mixed into an aqueous solvent and, for example, known supply sources, such as nitric acid, nitrates, sulfuric acid, sulfates, formic acid, formates, acetic acid, acetates, alkanesulfonic acids and alkanesulfonates, can be used appropriately. Examples of salts include metal salts and ammonium salts.

The metal surface treatment agent of the present embodiment may further contain other component(s). The other components are not particularly restricted, and examples thereof include fluorine compounds, metal components besides the above-enumerated metals (C), pH modifiers, and additives such as resins.

Examples of the fluorine compounds include hydrofluoric acid, ammonium fluoride, ammonium bifluoride, germanium fluoride, potassium fluoride, potassium bifluoride, iron fluoride, sodium fluoride, and sodium bifluoride. These fluorine compounds may be used singly, or in combination of two or more thereof.

Further, the fluorine content is preferably 4 times-30 times by mole with respect to the content of the ion (A) in terms of metal-equivalent molar concentration.

Examples of the metal components besides the above-enumerated metals (C) include, but not limited to: cobalt, nickel, manganese, trivalent chromium, tin, and tungsten.

Examples of the pH modifiers that can be used include, but not limited to: when increasing the pH, alkali components such as aqueous sodium hydroxide solutions, aqueous potassium hydroxide solutions, and aqueous ammonia solutions; and, when lowering the pH, acid components such as carbon dioxide gas, aqueous nitric acid solutions, aqueous sulfuric acid solutions, aqueous formic acid solutions, aqueous acetic acid solutions, and aqueous alkanesulfonic acid solutions.

Examples of the additives such as resins include, but not limited to: N-containing basic compounds and other resins. The N-containing basic compounds are not particularly restricted as long as they are basic compounds containing an N atom in their molecules, and examples thereof include ammonia; hydrazine compounds; hydroxylamines; aliphatic amines such as monobutylamine, dibutylamine, tributylamine, monoethylamine, diethylamine, triethylamine, monomethylamine, dimethylamine, trimethylamine, propylamine, isopropylamine, hexylamine, 2-ethylhexylamine, ethylenediamine, diethylenetriamine, octylamine, naphthylamine, and polyallylamine; alkanolamines such as monoethanolamine, diethanolamine, triethanolamine, methylethanolamine, dimethylethanolamine, diethylethanolamine, monoisopropanolamine, diisopropanolamine, triisopropanolamine, and diallylamine resin; amines containing an alicyclic ring and/or an aromatic ring; and nitrites such as ammonium nitrite and sodium nitrite.

The metal surface treatment agent of the present embodiment can be prepared by, in an aqueous solvent, appropriately mixing a supply source of the ion (A), the resin (B) and, as required, a supply source of the metal (C), an acid component capable of forming the acid radical (E), other components and the like such that the above-described respective prescribed concentrations are attained.

The aqueous solvent is not particularly restricted as long as it contains not less than 50% by mass of water based on the mass of all solvents. Examples of a solvent other than water that is contained in the aqueous solvent include alkane solvents, such as hexane and pentane; aromatic solvents, such as benzene and toluene; alcohol solvents, such as methanol, ethanol, 1-butanol, and ethylcellosolve; ether solvents, such as tetrahydrofuran and dioxane; ester solvents, such as ethyl acetate and butoxyethyl acetate; amide solvents, such as dimethylformamide and N-methylpyrrolidone; sulfoxide solvents, such as dimethylsulfoxide; and phosphoric acid amide solvents, such as hexamethylphosphoric triamide. These solvents besides water may be mixed singly, or in combination of two or more thereof. From the environmental and economical standpoints, it is preferred to use only water.

The pH of the metal surface treatment agent of the present embodiment is not particularly restricted; however, it is preferably in a range of 2.5 to 5.0, more preferably in a range of 3.5 to 4.5. A pH value described in the present specification represents a value of the pH of the treatment agent that is measured at 45° C. using a commercially available pH meter.

The method of surface-treating a metal material according to another embodiment of the present invention will now be described in detail.

The surface treatment method of the present embodiment includes the metal surface treatment step of bringing the above-described metal surface treatment agent into contact with a metal surface. By performing this surface treatment method, a metal material having a surface treatment coating layer can be produced. The metal surface treatment agent can be brought into contact with a metal material by any conventional contact method, examples of which include, but not limited to: a spraying method, a dipping method, and a combination thereof.

The metal surface treatment agent is preferably kept in contact with the metal material for a certain period in a prescribed temperature range. The contact temperature is preferably in a range of 20° C. to 60° C., more preferably in a range of 35° C. to 45° C. The contact time may be adjusted appropriately in accordance with the concentration of the metal surface treatment agent, and it is in a range of 30 seconds to 600 seconds, preferably in a range of 90 seconds to 180 seconds.

In the surface treatment method, the degreasing treatment step of performing so-called degreasing, which is a removal of oil and deposits from the metal material surface, may be performed prior to the metal surface treatment step, and the coating treatment step of forming a coating film on the metal material surface may be performed after the metal surface treatment step. After each of these steps, the water washing step, or the water-washing treatment and drying step may or may not be performed. A degreasing method in the degreasing treatment step is not particularly restricted, and any known method can be applied.

The coating treatment step is performed using a known coating material composition by a coating method, such as anionic electrodeposition coating, cationic electrodeposition coating, powder coating, solvent coating, or aqueous coating. The coating treatment step may be performed by a single coating method, or a combination of two or more coating methods. Prior to the coating treatment step, the metal material surface subjected to the metal surface treatment step may or may not be water-washed. Further, prior to the coating treatment step, the metal material surface that has or has not been water-washed may or may not be heat-dried.

For the above-described cationic electrodeposition coating, any known method can be applied. Examples thereof include a method of immersing the metal material subjected to the metal surface treatment step in a cationic electrodeposition coating material composition that contains an amine-added epoxy resin as a coating agent and a blocked polyisocyanate curing agent as a curing component. The cationic electrodeposition coating is performed by, for example, applying a voltage to a material to be coated in the cathode direction using a rectifier, with the coating agent being maintained at a prescribed temperature and stirred. The surface-coated metal material obtained in this manner is washed with water and then baked to form a coating film thereon. The baking is performed, for example, at 170° C. for 20 minutes. When a cationic electrodeposition coating method using a cationic electrodeposition coating agent is employed, it is preferred to control the sodium ion concentration in a treatment agent used in the degreasing step, which is a preceding step, or in the below-described various chemical conversion coating-forming steps, to be lower than 500 ppm by mass.

In the surface treatment method of the present embodiment, the chemical conversion coating-forming step may be performed between the degreasing treatment step and the metal surface treatment step and/or between the metal surface treatment step and the coating treatment step. Examples of a chemical conversion treatment step include the phosphate chemical conversion coating-forming step of forming a chemical conversion coating of a phosphate such as zinc phosphate; the zirconium chemical conversion coating-forming step of forming a chemical conversion coating of zirconium; the titanium chemical conversion coating-forming step of forming a chemical conversion coating of titanium; the hafnium chemical conversion coating-forming step of forming a chemical conversion coating of hafnium; and the vanadium chemical conversion coating-forming step of forming a chemical conversion coating of vanadium. Further, the surface treatment method may also include the phosphate chemical conversion coating-forming step of forming a chemical conversion coating of a phosphate on the metal material surface subjected to various treatment steps, and a prescribed chemical conversion treatment step of forming another chemical conversion coating on the thus-formed phosphate chemical conversion coating. Examples of the chemical conversion treatment step of forming a chemical conversion coating other than a phosphate chemical conversion coating include various chemical conversion coating-forming steps, such as the zirconium chemical conversion coating-forming step, the titanium chemical conversion coating-forming step, the hafnium chemical conversion coating-forming step, and the vanadium chemical conversion coating-forming step. In this manner, by performing a single chemical conversion coating-forming step or two different chemical conversion coating-forming steps, the corrosion resistance of the resulting metal material can be further improved.

As a phosphate chemical conversion coating-forming treatment, any known chemical conversion treatment with a phosphate can be employed. More specifically, a phosphate chemical conversion coating-forming treatment is carried out by performing, on the metal material surface that has been subjected to various treatment steps, an immersion treatment and/or a spraying treatment at 25 to 55° C. for 10 to 300 seconds using a phosphate treatment solution that contains phosphate ions (0.1 to 50 g/L) and zinc ions (0.01 to 3.0 g/L) and has a pH of 3.0 to 6.0. In the surface treatment method, the surface-adjusting treatment step, which is aimed at improving the reactivity in a phosphate chemical conversion treatment, may also be performed on the metal material prior to the phosphate chemical conversion coating-forming treatment step. As a surface-adjusting treatment method of this step, any known method can be employed.

As a zirconium chemical conversion coating-forming treatment, any known chemical conversion treatment with a zirconium chemical conversion treatment agent can be employed. Further, as a titanium chemical conversion coating-forming treatment, any known chemical conversion treatment with a titanium chemical conversion treatment agent can be employed. As a hafnium chemical conversion coating-forming treatment, any known chemical conversion treatment with a hafnium chemical conversion treatment agent can be employed. As a vanadium chemical conversion coating-forming treatment, any known chemical conversion treatment with a vanadium chemical conversion treatment agent can be employed. These chemical conversion treatments are carried out by, for example, performing, on the metal material surface that has been subjected to various treatment steps, an immersion treatment and/or a spraying treatment at 25 to 55° C. for 10 to 300 seconds using a treatment solution that contains zirconium ions, titanium ions, hafnium ions or vanadium ions at a concentration of 0.005 to 5.0 g/L and has a pH of 3.0 to 6.0.

When the surface treatment method of the present invention includes: the degreasing step; a single chemical conversion coating-forming step or two different chemical conversion coating-forming steps; the coating step; the degreasing step, and a single chemical conversion coating-forming step or two different chemical conversion coating-forming steps; the degreasing step and the coating step; a single chemical conversion coating-forming step or two different chemical conversion coating-forming steps, and the coating step; or the degreasing step, a single chemical conversion coating-forming step or two different chemical conversion coating-forming steps, and the coating step, the water washing step may be incorporated after each of these steps, or the water washing step may be incorporated into some of these steps.

Examples of the metal material that can be used include known metal materials, such as carbon steel sheet, alloyed steel sheet, and plated steel sheet, more specifically, cold-rolled steel sheet, hot-rolled steel sheet, hot-dip zinc-coated steel sheet, aluminum-containing galvanized steel sheet, electrogalvanized steel sheet, alloyed zinc-plated steel sheet, zinc-nickel plated steel sheet, zinc-cobalt plated steel sheet, zinc vapor-deposited steel sheet, nickel-plated steel sheet, tin-plated steel sheet, and magnesium sheet. Moreover, by applying the treatments of the present embodiment, the post-coating adhesion of the resulting coating film is also improved for those metal materials that have a relatively good corrosion resistance, such as stainless steel sheet, aluminum sheet, copper sheet, and titanium sheet.

Generally, when a resin is added to a chemical conversion treatment agent for the purpose of improving the corrosion resistance, the throwing power of an article is often reduced in the subsequent cationic electrodeposition coating. However, when cationic electrodeposition coating is performed on an article that has been brought into contact with the metal surface treatment agent of the present embodiment, not only good throwing power can be obtained but also good corrosion resistance can be attained even after the coating.

A metal material having a surface treatment coating layer can be produced by the above-described surface treatment method. The metal material having a surface treatment coating layer may also have one or two chemical conversion coatings obtained from one or two chemical conversion coating-forming steps, and/or one or more coating films, in addition to the surface treatment coating layer.

The amount of the surface treatment coating layer is preferably in a range of 5 mg/m$^2$ to 500 mg/m$^2$, more preferably in a range of 10 mg/m$^2$ to 200 mg/m$^2$, in terms of metal-equivalent mass of zirconium, titanium or hafnium; however, it is not restricted to be in this range. When two or more kinds of metals are used, a total amount thereof is preferably in the above-described range.

The metal-equivalent mass of zirconium, titanium or hafnium in the surface treatment coating layer can be determined by, for example, measuring the mass of each metal in the surface treatment coating layer using a fluorescent X-ray analyzer.

EXAMPLES

The present invention will now be described in more detail by way of Examples and Comparative Examples thereof. It is noted here, however, that the present invention is not restricted to the below-described Examples.
[Preparation of Test Pieces]
<Metal Material>

As a metal material, a cold-rolled mild steel sheet specified in JIS G3141 (SPCC: thickness=0.8 mm) or a hot-dip zinc-coated steel sheet defined in JIS G3302 (SGCC: thickness=0.8 mm) was used. The metal material was cut into a size of 70 mm in length×150 mm in width. The below-described evaluations of each test piece were performed on a surface having burrs generated by the cutting. The burr's height was about 100 μm.
<Synthesis of Resins>

Synthesis Example 1

First, 100 g of a bisphenol A-polyoxyethylene 2-mol adduct (NEWPOL BPE-20T, manufactured by Sanyo Chemical Industries, Ltd.; the below-described b2-1), 105 g of a polyethylene glycol (PEG1000, manufactured by DKS Co., Ltd.; the below-described b3-1), 15 g of trimethylolpropane (TMP, manufactured by Perstorp Holding AB; the below-described b4-1), 30 g of N-methyldiethanolamine (aminoalcohol MDA, manufactured by Nippon Nyukazai Co., Ltd.; the below-described b5-1), and 250 g of dicyclohexylmethane-4,4'-diisocyanate (DESMODUR W, manufactured by Bayer AG; the below-described b1-1) were added to and sufficiently dissolved in 400 g of methyl ethyl ketone. After allowing the resulting mixed solution to react at 80° C. for about 2 hours, it was confirmed that the reaction solution contained 3% by mass or less of isocyanate groups, and 8 g of formic acid (the below-described ionizing agent b6-1) was further added thereto (production of a urethane prepolymer). It is noted here that, in accordance with JIS K7301:1995, the content ratio of isocyanate groups can be calculated by the following equation after dissolving 2 g of the reaction solution in dimethylformamide, adding thereto 10 ml of an n-dibutylamine-toluene solution, and subsequently titrating the resultant with a 0.5-mol/L hydrochloric acid solution using bromophenol blue as an indicator:

$$NCO(\%) = \frac{(A - B) \times f \times N \times 42.02}{S \times 1000} \times 100$$

(wherein, A means the volume of the hydrochloric acid solution required for titrating the amount (mass) of isocyanate used in the preparation of a reaction solution in a prescribed amount (=S); B means the volume of the hydrochloric acid solution required for titrating the prescribed amount (=S) of the reaction solution; f means "1"; N means the molar concentration of hydrochloric acid standard solution; and S means the mass of the reaction solution respectively).

Subsequently, 1,000 g of deionized water was added to prepare a urethane emulsion. From the thus obtained urethane emulsion, methyl ethyl ketone was removed by vacuum distillation, whereby a urethane resin having a urethane resin concentration of 25% by mass was prepared.

Synthesis Examples 2 to 18

Urethane resins of Synthesis Examples 2 to 18 were prepared by the same synthesis method as in Synthesis Example 1, except that the added amounts (% by mass) of the respective components were adjusted as prescribed in Table 1.

TABLE 1

| Synthesis Example | Polyisocyanate(b1) | | Polyol(b2) | | Diol(b3) | | | | Diol(b4) | | | |
|---|---|---|---|---|---|---|---|---|---|---|---|---|
| | Type | Added amount | Type | Added amount | Type | Added amount | Type | Added amount | Type | Added amount | Type | Added amount |
| Synthesis Example1 | b1-1 | 50% | b2-1 | 20% | b3-1 | 21% | | | b4-1 | 3% | | |
| Synthesis Example2 | b1-1 | 50% | b2-1 | 20% | b3-1 | 21% | | | b4-1 | 3% | | |
| Synthesis Example3 | b1-1 | 50% | b2-1 | 20% | b3-1 | 21% | | | b4-1 | 3% | | |
| Synthesis Example4 | b1-1 | 50% | b2-1 | 20% | b3-2 | 21% | | | b4-1 | 3% | | |
| Synthesis Example5 | b1-1 | 55% | b2-1 | 16% | b3-1 | 17% | | | b4-1 | 2% | | |
| Synthesis Example6 | b1-1 | 56% | b2-2 | 10% | b3-1 | 24% | | | b4-1 | 3% | | |
| Synthesis Example7 | b1-1 | 50% | b2-1 | 20% | b3-1 | 21% | | | b4-1 | 3% | | |
| Synthesis Example8 | b1-1 | 50% | b2-1 | 20% | b3-1 | 21% | | | b4-1 | 3% | | |
| Synthesis Example9 | b1-1 | 46% | b2-1 | 23% | b3-1 | 25% | | | b4-1 | 3% | | |
| Synthesis Example10 | b1-2 | 38% | b2-1 | 23% | b3-1 | 25% | | | b4-1 | 3% | | |
| Synthesis Example11 | b1-1 | 52% | b2-3 | 14% | b3-2 | 22% | | | b4-1 | 3% | | |
| Synthesis Example12 | b1-1 | 57% | b2-1 | 13% | b3-1 | 13% | | | b4-1 | 2% | | |
| Synthesis Example13 | b1-1 | 67% | b2-1 | 15% | b3-1 | 16% | | | b4-1 | 2% | | |

TABLE 1-continued

| Synthesis Example | | | | | | | | | | |
|---|---|---|---|---|---|---|---|---|---|---|
| Synthesis Example14 | b1-1 | 50% | b2-1 | 20% | b3-1 | 21% | | | b4-1 | 3% | | |
| Synthesis Example15 | b1-1 | 50% | b2-1 | 20% | b3-1 | 10.5% | b3-2 | 10.5% | b4-1 | 3% | | |
| Synthesis Example16 | b1-1 | 50% | b2-1 | 20% | b3-1 | 14% | | | b4-1 | 3% | b4-2 | 7% |
| Synthesis Example17 | b1-1 | 50% | b2-1 | 20% | b3-1 | 14% | | | b4-1 | 3% | b4-3 | 7% |
| Synthesis Example18 | b1-1 | 50% | b2-1 | 20% | b3-1 | 21% | | | b4-1 | 3% | | |

| Synthesis Example | Tertiary amine compound(b5) | | Neutralizer(b6) | | Reaction time |
|---|---|---|---|---|---|
| | Type | Added amount | Type | Neutralization rate | |
| Synthesis Example1 | b5-1 | 6% | b6-1 | 70% | 2 h |
| Synthesis Example2 | b5-1 | 6% | b6-1 | 70% | 4 h |
| Synthesis Example3 | b5-1 | 6% | b6-1 | 70% | 6 h |
| Synthesis Example4 | b5-1 | 6% | b6-1 | 70% | 6 h |
| Synthesis Example5 | b5-1 | 11% | b6-1 | 70% | 6 h |
| Synthesis Example6 | b5-1 | 7% | b6-1 | 70% | 6 h |
| Synthesis Example7 | b5-1 | 6% | b6-2 | 70% | 6 h |
| Synthesis Example8 | b5-1 | 6% | b6-3 | 70% | 6 h |
| Synthesis Example9 | b5-1 | 3% | b6-1 | 70% | 6 h |
| Synthesis Example10 | b5-1 | 11% | b6-1 | 70% | 6 h |
| Synthesis Example11 | b5-1 | 9% | b6-1 | 70% | 6 h |
| Synthesis Example12 | b5-1 | 15% | b6-1 | 70% | 6 h |
| Synthesis Example13 | b5-1 | 1% | b6-1 | 70% | 6 h |
| Synthesis Example14 | b5-1 | 6% | b6-1 | 70% | 1 h |
| Synthesis Example15 | b5-1 | 6% | b6-1 | 70% | 6 h |
| Synthesis Example16 | b5-1 | 6% | b6-1 | 70% | 6 h |
| Synthesis Example17 | b5-1 | 6% | b6-1 | 70% | 6 h |
| Synthesis Example18 | b5-2 | 6% | b6-1 | 70% | 6 h |

The components shown in Table 1 are as follows. The added amount (% by mass) of each component shown in Table 1 indicates the mass ratio of the component with respect to the total amount of the components (b1) to (b5). It is noted here that the urethane prepolymers obtained in all Synthesis Examples contained isocyanate groups.

<Polyisocyanates (b1; Some of the Following Polyisocyanates has a Cyclohexane Ring Structure)> b1-1: dicyclohexylmethane-4,4'-diisocyanate (DESMODUR W, manufactured by Bayer AG)

b1-2: hexamethylene diisocyanate (50M-HDI, manufactured by Asahi Kasei Corporation)

<Polyols (b2)> b2-1: bisphenol A-polyoxyethylene 2-mol adduct (NEWPOL BPE20T, manufactured by Sanyo Chemical Industries, Ltd.)

b2-2: cyclohexane dimethanol (manufactured by Tokyo Chemical Industry Co., Ltd.) b2-3: bisphenol A (manufactured by Mitsubishi Chemical Corporation)

<Diols (b3)> b3-1: polyethylene glycol (PEG1000, Mw: 1,000, manufactured by Sanyo Chemical Industries, Ltd.)

b3-2: polyester polyol (NIPPOLLAN 4040, Mw: 2,000, manufactured by Tosoh Corporation)

<Diols (b4)> b4-1: trimethylolpropane (TMP, manufactured by Perstorp Holding AB) b4-2: polyethylene glycol (PEG400, Mw: 400, manufactured by Sanyo Chemical Industries, Ltd.)

b4-3: diethylene glycol (manufactured by Nippon Shokubai Co., Ltd.)

<Tertiary Amine Compounds (b5)> b5-1: N-methyldiethanolamine (aminoalcohol MDA, manufactured by Nippon Nyukazai Co., Ltd.)

b5-2: DMPA (dimethylol propionic acid, manufactured by Perstorp Holding AB)

<Ionizing Agents (b6)>

Ionizing agent b6-1: formic acid (manufactured by Asahi Chemical Co., Ltd.) Ionizing agent b6-2: methanesulfonic acid (manufactured by Tosoh Corporation) Ionizing agent b6-3: dimethyl sulfate (manufactured by Tsujimoto Chemical Co., Ltd.)

<Preparation of Metal Surface Treatment Agents>

Metal surface treatment agents of Examples 1 to 264 and Comparative Examples 1 to 10 were each prepared by adding various components to water at the respective prescribed concentrations shown in Tables 2-1 to 2-5. As a supply source of the ion (A), hexafluorozirconic acid, hexafluorotitanic acid or hexafluorohafnic acid was used in Examples 1 to 66 and Comparative Examples 1 to 10; zirconium oxysulfate, titanium oxysulfate or hexafluorohafnic acid was used in Examples 67 to 132; zirconium oxynitrate, titanium oxynitrate or hexafluorohafnic acid was used in Examples 133 to 198; and zirconium hydroxide (R zirconium hydroxide, manufactured by Daiichi Kigenso Kagaku Kogyo Co., Ltd.), titanium (IV) oxide or hexafluorohafnic acid was used in Examples 199 to 264 respectively. As an aluminum-containing metal compound, aluminum nitrate nonahydrate was used; as a supply source of nitric acid radicals, the above-described zirconium oxynitrate, the above-described titanium oxynitrate, the above-described aluminum nitrate nonahydrate, nitric acid or the like was used; and, as a supply source of alkanesulfonic acid radicals, methanesulfonic acid (shown as "MSA" in Tables) was used. In Examples 19, 52, 85, 118, 151, 184, 217 and 250, aluminum oxide was used in place of aluminum nitrate nonahydrate. Further add an allylamine polymer (PAA-03, manufactured by Nittobo Medical Co., Ltd.) in examples 29, 62, 95, 128, 161, 194, 227 and 260, an allylamine hydrochloride-diallylamine hydrochloride copolymer (PAA-D11-HCL, manufactured by Nittobo Medical Co., Ltd.) in examples 30, 63, 96, 129, 162, 195, 228 and 261, a diallylamine hydrochloride polymer (PAS-21CL, manufactured by Nittobo Medical Co., Ltd.) in examples 31, 64, 97, 130, 163, 196, 229 and 262, a diallylamine hydrochloride-sulfur dioxide copolymer (PAS-92, manufactured by Nittobo Medical Co., Ltd.) in examples 32, 65, 98, 131, 164, 197, 230 and 263, and a methyldiallylamine hydrochloride polymer (PAS-M-1, manufactured by Nittobo Medical Co., Ltd.) in examples 33, 66, 99, 132, 165, 198, 231 and 264, in an amount of 0.1 g/L, respectively. Moreover, as the resin (B), each resin synthesized in Synthesis Examples 1 to 18 was used. The pH was adjusted with an aqueous solution of nitric acid or sodium hydroxide. In Examples 19, 52, 85, 118, 151, 184, 217 and 250, however, the pH was adjusted with an aqueous solution of methanesulfonic acid or sodium hydroxide.

TABLE 2-1

| Treatment solution | Resin B Synthesis Example | Molecular weight | Amine value | Presence or absence of cyclohexane ring | Added amount [mg/L] | Ion (A) Zr | Ti | Hf | Ion (C) Al | Acid radical (E) Nitric acid | MSA | Other HF |
|---|---|---|---|---|---|---|---|---|---|---|---|---|
| Example1 | 2 | 120000 | 30.0 | Present | 547.20 | 2.00 | 0.00 | 0.00 | 6.00 | 47.62 | 0.00 | 18.00 |
| Example2 | 2 | 120000 | 30.0 | Present | 510.72 | 8.00 | 0.00 | 0.00 | 6.00 | 47.62 | 0.00 | 18.00 |
| Example3 | 2 | 120000 | 30.0 | Present | 528.00 | 0.00 | 2.00 | 0.00 | 6.00 | 47.62 | 0.00 | 18.00 |
| Example4 | 2 | 120000 | 30.0 | Present | 765.60 | 1.00 | 1.00 | 0.00 | 6.00 | 47.62 | 0.00 | 18.00 |
| Example5 | 2 | 120000 | 30.0 | Present | 1483.35 | 1.00 | 0.00 | 1.00 | 6.00 | 47.62 | 0.00 | 18.00 |
| Example6 | 1 | 70000 | 30.0 | Present | 500.00 | 1.00 | 0.00 | 0.00 | 6.00 | 47.62 | 0.00 | 18.00 |
| Example7 | 2 | 120000 | 30.0 | Present | 500.00 | 1.00 | 0.00 | 0.00 | 6.00 | 47.62 | 0.00 | 18.00 |
| Example8 | 3 | 1200000 | 30.0 | Present | 500.00 | 1.00 | 0.00 | 0.00 | 6.00 | 47.62 | 0.00 | 18.00 |
| Example9 | 9 | 120000 | 14.0 | Present | 500.00 | 1.00 | 0.00 | 0.00 | 6.00 | 47.62 | 0.00 | 18.00 |
| Example10 | 5 | 120000 | 52.0 | Present | 500.00 | 1.00 | 0.00 | 0.00 | 6.00 | 47.62 | 0.00 | 18.00 |
| Example11 | 12 | 120000 | 71.0 | Present | 500.00 | 1.00 | 0.00 | 0.00 | 6.00 | 47.62 | 0.00 | 18.00 |
| Example12 | 13 | 120000 | 4.7 | Present | 500.00 | 1.00 | 0.00 | 0.00 | 6.00 | 47.62 | 0.00 | 18.00 |
| Example13 | 6 | 120000 | 34.0 | Present | 500.00 | 1.00 | 0.00 | 0.00 | 6.00 | 47.62 | 0.00 | 18.00 |
| Example14 | 10 | 120000 | 52.0 | Absent | 500.00 | 1.00 | 0.00 | 0.00 | 6.00 | 47.62 | 0.00 | 18.00 |
| Example15 | 2 | 120000 | 30.0 | Present | 500.00 | 0.40 | 0.00 | 0.00 | 6.00 | 47.62 | 0.00 | 18.00 |
| Example16 | 2 | 120000 | 30.0 | Present | 4900.00 | 2.00 | 0.00 | 0.00 | 6.00 | 47.62 | 0.00 | 18.00 |
| Example17 | 2 | 120000 | 30.0 | Present | 5472.00 | 2.00 | 0.00 | 0.00 | 6.00 | 47.62 | 0.00 | 18.00 |
| Example18 | 2 | 120000 | 30.0 | Present | 9500.00 | 2.00 | 0.00 | 0.00 | 6.00 | 47.62 | 0.00 | 18.00 |
| Example19 | 2 | 120000 | 30.0 | Present | 500.00 | 1.00 | 0.00 | 0.00 | 6.00 | 0.00 | 20.83 | 18.00 |
| Example20 | 2 | 120000 | 30.0 | Present | 500.00 | 0.10 | 0.00 | 0.00 | 6.00 | 47.62 | 0.00 | 18.00 |
| Example21 | 7 | 120000 | 30.0 | Present | 500.00 | 1.00 | 0.00 | 0.00 | 6.00 | 47.62 | 0.00 | 18.00 |
| Example22 | 8 | 120000 | 30.0 | Present | 500.00 | 1.00 | 0.00 | 0.00 | 6.00 | 47.62 | 0.00 | 18.00 |
| Example23 | 4 | 120000 | 30.0 | Present | 500.00 | 1.00 | 0.00 | 0.00 | 6.00 | 47.62 | 0.00 | 18.00 |
| Example24 | 2 | 120000 | 30.0 | Present | 500.00 | 1.00 | 0.00 | 0.00 | 6.00 | 47.62 | 0.00 | 18.00 |
| Example25 | 15 | 120000 | 30.0 | Present | 500.00 | 1.00 | 0.00 | 0.00 | 6.00 | 47.62 | 0.00 | 18.00 |
| Example26 | 16 | 120000 | 30.0 | Present | 500.00 | 1.00 | 0.00 | 0.00 | 6.00 | 47.62 | 0.00 | 18.00 |
| Example27 | 17 | 120000 | 30.0 | Present | 500.00 | 1.00 | 0.00 | 0.00 | 6.00 | 47.62 | 0.00 | 18.00 |
| Example28 | 2 | 120000 | 30.0 | Present | 500.00 | 1.00 | 0.00 | 0.00 | 0.00 | 0.00 | 0.00 | 0.00 |
| Example29 | 15 | 120000 | 30.0 | Present | 500.00 | 1.00 | 0.00 | 0.00 | 6.00 | 47.62 | 0.00 | 18.00 |
| Example30 | 15 | 120000 | 30.0 | Present | 500.00 | 1.00 | 0.00 | 0.00 | 6.00 | 47.62 | 0.00 | 18.00 |
| Example31 | 15 | 120000 | 30.0 | Present | 500.00 | 1.00 | 0.00 | 0.00 | 6.00 | 47.62 | 0.00 | 18.00 |
| Example32 | 15 | 120000 | 30.0 | Present | 500.00 | 1.00 | 0.00 | 0.00 | 6.00 | 47.62 | 0.00 | 18.00 |
| Example33 | 15 | 120000 | 30.0 | Present | 500.00 | 1.00 | 0.00 | 0.00 | 6.00 | 47.62 | 0.00 | 18.00 |
| Example34 | 2 | 120000 | 30.0 | Present | 547.20 | 2.00 | 0.00 | 0.00 | 6.00 | 47.62 | 0.00 | 18.00 |
| Example35 | 2 | 120000 | 30.0 | Present | 510.72 | 8.00 | 0.00 | 0.00 | 6.00 | 47.62 | 0.00 | 18.00 |
| Example36 | 2 | 120000 | 30.0 | Present | 528.00 | 0.00 | 2.00 | 0.00 | 6.00 | 47.62 | 0.00 | 18.00 |
| Example37 | 2 | 120000 | 30.0 | Present | 765.60 | 1.00 | 1.00 | 0.00 | 6.00 | 47.62 | 0.00 | 18.00 |
| Example38 | 2 | 120000 | 30.0 | Present | 1483.35 | 1.00 | 0.00 | 1.00 | 6.00 | 47.62 | 0.00 | 18.00 |
| Example39 | 1 | 70000 | 30.0 | Present | 500.00 | 1.00 | 0.00 | 0.00 | 6.00 | 47.62 | 0.00 | 18.00 |

TABLE 2-1-continued

| | | | | | | | | | | | | |
|---|---|---|---|---|---|---|---|---|---|---|---|---|
| Example40 | 2 | 120000 | 30.0 | Present | 500.00 | 1.00 | 0.00 | 0.00 | 6.00 | 47.62 | 0.00 | 18.00 |
| Example41 | 3 | 1200000 | 30.0 | Present | 500.00 | 1.00 | 0.00 | 0.00 | 6.00 | 47.62 | 0.00 | 18.00 |
| Example42 | 9 | 120000 | 14.0 | Present | 500.00 | 1.00 | 0.00 | 0.00 | 6.00 | 47.62 | 0.00 | 18.00 |
| Example43 | 5 | 120000 | 52.0 | Present | 500.00 | 1.00 | 0.00 | 0.00 | 6.00 | 47.62 | 0.00 | 18.00 |
| Example44 | 12 | 120000 | 71.0 | Present | 500.00 | 1.00 | 0.00 | 0.00 | 6.00 | 47.62 | 0.00 | 18.00 |
| Example45 | 13 | 120000 | 4.7 | Present | 500.00 | 1.00 | 0.00 | 0.00 | 6.00 | 47.62 | 0.00 | 18.00 |
| Example46 | 6 | 120000 | 34.0 | Present | 500.00 | 1.00 | 0.00 | 0.00 | 6.00 | 47.62 | 0.00 | 18.00 |
| Example47 | 10 | 120000 | 52.0 | Absent | 500.00 | 1.00 | 0.00 | 0.00 | 6.00 | 47.62 | 0.00 | 18.00 |
| Example48 | 2 | 120000 | 30.0 | Present | 500.00 | 0.40 | 0.00 | 0.00 | 6.00 | 47.62 | 0.00 | 18.00 |
| Example49 | 2 | 120000 | 30.0 | Present | 4900.00 | 2.00 | 0.00 | 0.00 | 6.00 | 47.62 | 0.00 | 18.00 |
| Example50 | 2 | 120000 | 30.0 | Present | 5472.00 | 2.00 | 0.00 | 0.00 | 6.00 | 47.62 | 0.00 | 18.00 |
| Example51 | 2 | 120000 | 30.0 | Present | 9500.00 | 2.00 | 0.00 | 0.00 | 6.00 | 47.62 | 0.00 | 18.00 |
| Example52 | 2 | 120000 | 30.0 | Present | 500.00 | 1.00 | 0.00 | 0.00 | 6.00 | 0.00 | 20.83 | 18.00 |
| Example53 | 2 | 120000 | 30.0 | Present | 500.00 | 0.10 | 0.00 | 0.00 | 6.00 | 47.62 | 0.00 | 18.00 |
| Example54 | 7 | 120000 | 30.0 | Present | 500.00 | 1.00 | 0.00 | 0.00 | 6.00 | 47.62 | 0.00 | 18.00 |
| Example55 | 8 | 120000 | 30.0 | Present | 500.00 | 1.00 | 0.00 | 0.00 | 6.00 | 47.62 | 0.00 | 18.00 |
| Example56 | 4 | 120000 | 30.0 | Present | 500.00 | 1.00 | 0.00 | 0.00 | 6.00 | 47.62 | 0.00 | 18.00 |
| Example57 | 2 | 120000 | 30.0 | Present | 500.00 | 1.00 | 0.00 | 0.00 | 6.00 | 47.62 | 0.00 | 18.00 |
| Example58 | 15 | 120000 | 30.0 | Present | 500.00 | 1.00 | 0.00 | 0.00 | 6.00 | 47.62 | 0.00 | 18.00 |
| Example59 | 16 | 120000 | 30.0 | Present | 500.00 | 1.00 | 0.00 | 0.00 | 6.00 | 47.62 | 0.00 | 18.00 |
| Example60 | 17 | 120000 | 30.0 | Present | 500.00 | 1.00 | 0.00 | 0.00 | 6.00 | 47.62 | 0.00 | 18.00 |
| Example61 | 2 | 120000 | 30.0 | Present | 500.00 | 1.00 | 0.00 | 0.00 | 0.00 | 0.00 | 0.00 | 0.00 |
| Example62 | 15 | 120000 | 30.0 | Present | 500.00 | 1.00 | 0.00 | 0.00 | 6.00 | 47.62 | 0.00 | 18.00 |
| Example63 | 15 | 120000 | 30.0 | Present | 500.00 | 1.00 | 0.00 | 0.00 | 6.00 | 47.62 | 0.00 | 18.00 |
| Example64 | 15 | 120000 | 30.0 | Present | 500.00 | 1.00 | 0.00 | 0.00 | 6.00 | 47.62 | 0.00 | 18.00 |
| Example65 | 15 | 120000 | 30.0 | Present | 500.00 | 1.00 | 0.00 | 0.00 | 6.00 | 47.62 | 0.00 | 18.00 |
| Example66 | 15 | 120000 | 30.0 | Present | 500.00 | 1.00 | 0.00 | 0.00 | 6.00 | 47.62 | 0.00 | 18.00 |

| Treatment solution | pH | [$B_M$ mass]/[$A_M$ mass] |
|---|---|---|
| Example1 | 4.0 | 3.00 |
| Example2 | 4.0 | 0.70 |
| Example3 | 4.0 | 5.50 |
| Example4 | 4.0 | 5.50 |
| Example5 | 4.0 | 5.50 |
| Example6 | 4.0 | 5.48 |
| Example7 | 4.0 | 5.48 |
| Example8 | 4.0 | 5.48 |
| Example9 | 4.0 | 5.48 |
| Example10 | 4.0 | 5.48 |
| Example11 | 4.0 | 5.48 |
| Example12 | 4.0 | 5.48 |
| Example13 | 4.0 | 5.48 |
| Example14 | 4.0 | 5.48 |
| Example15 | 4.0 | 13.71 |
| Example16 | 4.0 | 26.86 |
| Example17 | 4.0 | 30.00 |
| Example18 | 4.0 | 52.08 |
| Example19 | 4.0 | 5.48 |
| Example20 | 4.0 | 54.82 |
| Example21 | 4.0 | 5.48 |
| Example22 | 4.0 | 5.48 |
| Example23 | 4.0 | 5.48 |
| Example24 | 4.0 | 5.48 |
| Example25 | 4.0 | 5.48 |
| Example26 | 4.0 | 5.48 |
| Example27 | 4.0 | 5.48 |
| Example28 | 4.0 | 5.48 |
| Example29 | 4.0 | 5.48 |
| Example30 | 4.0 | 5.48 |
| Example31 | 4.0 | 5.48 |
| Example32 | 4.0 | 5.48 |
| Example33 | 4.0 | 5.48 |
| Example34 | 3.6 | 3.00 |
| Example35 | 3.6 | 0.70 |
| Example36 | 3.6 | 5.50 |
| Example37 | 3.6 | 5.50 |
| Example38 | 3.6 | 5.50 |
| Example39 | 3.6 | 5.48 |
| Example40 | 3.6 | 5.48 |
| Example41 | 3.6 | 5.48 |
| Example42 | 3.6 | 5.48 |
| Example43 | 3.6 | 5.48 |
| Example44 | 3.6 | 5.48 |
| Example45 | 3.6 | 5.48 |
| Example46 | 3.6 | 5.48 |
| Example47 | 3.6 | 5.48 |
| Example48 | 3.6 | 13.71 |

TABLE 2-1-continued

| | | |
|---|---|---|
| Example49 | 3.6 | 26.86 |
| Example50 | 3.6 | 30.00 |
| Example51 | 3.6 | 52.08 |
| Example52 | 3.6 | 5.48 |
| Example53 | 3.6 | 54.82 |
| Example54 | 3.6 | 5.48 |
| Example55 | 3.6 | 5.48 |
| Example56 | 3.6 | 5.48 |
| Example57 | 3.6 | 5.48 |
| Example58 | 3.6 | 5.48 |
| Example59 | 3.6 | 5.48 |
| Example60 | 3.6 | 5.48 |
| Example61 | 3.6 | 5.48 |
| Example62 | 3.6 | 5.48 |
| Example63 | 3.6 | 5.48 |
| Example64 | 3.6 | 5.48 |
| Example65 | 3.6 | 5.48 |
| Example66 | 3.6 | 5.48 |

TABLE 2-2

| | ResinB | | | | Added amount [mmol/L] | | | | | | |
|---|---|---|---|---|---|---|---|---|---|---|---|
| | | | | | Ion (A) | | | Ion (C) | Acid radical (E) | | Other |
| Treatment solution | Synthesis Example | Molecular weight | Amine value | Presence or absence of cyclohexane ring | Added amount [mg/L] | Zr | Ti | HF | Al | Nitric acid | MSA | HF |
| Example67 | 2 | 120000 | 30.0 | Present | 547.20 | 2.00 | 0.00 | 0.00 | 6.00 | 47.62 | 0.00 | 26.00 |
| Example68 | 2 | 120000 | 30.0 | Present | 510.72 | 8.00 | 0.00 | 0.00 | 6.00 | 47.62 | 0.00 | 50.00 |
| Example69 | 2 | 120000 | 30.0 | Present | 528.00 | 0.00 | 2.00 | 0.00 | 6.00 | 47.62 | 0.00 | 26.00 |
| Example70 | 2 | 120000 | 30.0 | Present | 765.60 | 1.00 | 1.00 | 0.00 | 6.00 | 47.62 | 0.00 | 26.00 |
| Example71 | 2 | 120000 | 30.0 | Present | 1483.35 | 1.00 | 0.00 | 1.00 | 6.00 | 47.62 | 0.00 | 22.00 |
| Example72 | 1 | 70000 | 30.0 | Present | 500.00 | 1.00 | 0.00 | 0.00 | 6.00 | 47.62 | 0.00 | 22.00 |
| Example73 | 2 | 120000 | 30.0 | Present | 500.00 | 1.00 | 0.00 | 0.00 | 6.00 | 47.62 | 0.00 | 22.00 |
| Example74 | 3 | 1200000 | 30.0 | Present | 500.00 | 1.00 | 0.00 | 0.00 | 6.00 | 47.62 | 0.00 | 22.00 |
| Example75 | 9 | 120000 | 14.0 | Present | 500.00 | 1.00 | 0.00 | 0.00 | 6.00 | 47.62 | 0.00 | 22.00 |
| Example76 | 5 | 120000 | 52.0 | Present | 500.00 | 1.00 | 0.00 | 0.00 | 6.00 | 47.62 | 0.00 | 22.00 |
| Example77 | 12 | 120000 | 71.0 | Present | 500.00 | 1.00 | 0.00 | 0.00 | 6.00 | 47.62 | 0.00 | 22.00 |
| Example78 | 13 | 120000 | 4.7 | Present | 500.00 | 1.00 | 0.00 | 0.00 | 6.00 | 47.62 | 0.00 | 22.00 |
| Example79 | 6 | 120000 | 34.0 | Present | 500.00 | 1.00 | 0.00 | 0.00 | 6.00 | 47.62 | 0.00 | 22.00 |
| Example80 | 10 | 120000 | 52.0 | Absent | 500.00 | 1.00 | 0.00 | 0.00 | 6.00 | 47.62 | 0.00 | 22.00 |
| Example81 | 2 | 120000 | 30.0 | Present | 500.00 | 0.40 | 0.00 | 0.00 | 6.00 | 47.62 | 0.00 | 19.60 |
| Example82 | 2 | 120000 | 30.0 | Present | 4900.00 | 2.00 | 0.00 | 0.00 | 6.00 | 47.62 | 0.00 | 26.00 |
| Example83 | 2 | 120000 | 30.0 | Present | 5472.00 | 2.00 | 0.00 | 0.00 | 6.00 | 47.62 | 0.00 | 26.00 |
| Example84 | 2 | 120000 | 30.0 | Present | 9500.00 | 2.00 | 0.00 | 0.00 | 6.00 | 47.62 | 0.00 | 26.00 |
| Example85 | 2 | 120000 | 30.0 | Present | 500.00 | 1.00 | 0.00 | 0.00 | 6.00 | 0.00 | 20.83 | 22.00 |
| Example86 | 2 | 120000 | 30.0 | Present | 500.00 | 0.10 | 0.00 | 0.00 | 6.00 | 47.62 | 0.00 | 18.40 |
| Example87 | 7 | 120000 | 30.0 | Present | 500.00 | 1.00 | 0.00 | 0.00 | 6.00 | 47.62 | 0.00 | 22.00 |
| Example88 | 8 | 120000 | 30.0 | Present | 500.00 | 1.00 | 0.00 | 0.00 | 6.00 | 47.62 | 0.00 | 22.00 |
| Example89 | 4 | 120000 | 30.0 | Present | 500.00 | 1.00 | 0.00 | 0.00 | 6.00 | 47.62 | 0.00 | 22.00 |
| Example90 | 2 | 120000 | 30.0 | Present | 500.00 | 1.00 | 0.00 | 0.00 | 6.00 | 47.62 | 0.00 | 22.00 |
| Example91 | 15 | 120000 | 30.0 | Present | 500.00 | 1.00 | 0.00 | 0.00 | 6.00 | 47.62 | 0.00 | 22.00 |
| Example92 | 16 | 120000 | 30.0 | Present | 500.00 | 1.00 | 0.00 | 0.00 | 6.00 | 47.62 | 0.00 | 22.00 |
| Example93 | 17 | 120000 | 30.0 | Present | 500.00 | 1.00 | 0.00 | 0.00 | 6.00 | 47.62 | 0.00 | 22.00 |
| Example94 | 2 | 120000 | 30.0 | Present | 500.00 | 1.00 | 0.00 | 0.00 | 0.00 | 0.00 | 0.00 | 4.00 |
| Example95 | 15 | 120000 | 30.0 | Present | 500.00 | 1.00 | 0.00 | 0.00 | 6.00 | 47.62 | 0.00 | 22.00 |
| Example96 | 15 | 120000 | 30.0 | Present | 500.00 | 1.00 | 0.00 | 0.00 | 6.00 | 47.62 | 0.00 | 22.00 |
| Example97 | 15 | 120000 | 30.0 | Present | 500.00 | 1.00 | 0.00 | 0.00 | 6.00 | 47.62 | 0.00 | 22.00 |
| Example98 | 15 | 120000 | 30.0 | Present | 500.00 | 1.00 | 0.00 | 0.00 | 6.00 | 47.62 | 0.00 | 22.00 |
| Example99 | 15 | 120000 | 30.0 | Present | 500.00 | 1.00 | 0.00 | 0.00 | 6.00 | 47.62 | 0.00 | 22.00 |
| Example100 | 2 | 120000 | 30.0 | Present | 547.20 | 2.00 | 0.00 | 0.00 | 6.00 | 47.62 | 0.00 | 26.00 |
| Example101 | 2 | 120000 | 30.0 | Present | 510.72 | 8.00 | 0.00 | 0.00 | 6.00 | 47.62 | 0.00 | 50.00 |
| Example102 | 2 | 120000 | 30.0 | Present | 528.00 | 0.00 | 2.00 | 0.00 | 6.00 | 47.62 | 0.00 | 26.00 |
| Example103 | 2 | 120000 | 30.0 | Present | 765.60 | 1.00 | 1.00 | 0.00 | 6.00 | 47.62 | 0.00 | 26.00 |
| Example104 | 2 | 120000 | 30.0 | Present | 1483.35 | 1.00 | 0.00 | 1.00 | 6.00 | 47.62 | 0.00 | 22.00 |
| Example105 | 1 | 70000 | 30.0 | Present | 500.00 | 1.00 | 0.00 | 0.00 | 6.00 | 47.62 | 0.00 | 22.00 |
| Example106 | 2 | 120000 | 30.0 | Present | 500.00 | 1.00 | 0.00 | 0.00 | 6.00 | 47.62 | 0.00 | 22.00 |
| Example107 | 3 | 1200000 | 30.0 | Present | 500.00 | 1.00 | 0.00 | 0.00 | 6.00 | 47.62 | 0.00 | 22.00 |
| Example108 | 9 | 120000 | 14.0 | Present | 500.00 | 1.00 | 0.00 | 0.00 | 6.00 | 47.62 | 0.00 | 22.00 |
| Example109 | 5 | 120000 | 52.0 | Present | 500.00 | 1.00 | 0.00 | 0.00 | 6.00 | 47.62 | 0.00 | 22.00 |
| Example110 | 12 | 120000 | 71.0 | Present | 500.00 | 1.00 | 0.00 | 0.00 | 6.00 | 47.62 | 0.00 | 22.00 |
| Example111 | 13 | 120000 | 4.7 | Present | 500.00 | 1.00 | 0.00 | 0.00 | 6.00 | 47.62 | 0.00 | 22.00 |
| Example112 | 6 | 120000 | 34.0 | Present | 500.00 | 1.00 | 0.00 | 0.00 | 6.00 | 47.62 | 0.00 | 22.00 |
| Example113 | 10 | 120000 | 52.0 | Absent | 500.00 | 1.00 | 0.00 | 0.00 | 6.00 | 47.62 | 0.00 | 22.00 |

TABLE 2-2-continued

| | | | | | | | | | | | | |
|---|---|---|---|---|---|---|---|---|---|---|---|---|
| Example114 | 2 | 120000 | 30.0 | Present | 500.00 | 0.40 | 0.00 | 0.00 | 6.00 | 47.62 | 0.00 | 19.60 |
| Example115 | 2 | 120000 | 30.0 | Present | 4900.00 | 2.00 | 0.00 | 0.00 | 6.00 | 47.62 | 0.00 | 26.00 |
| Example116 | 2 | 120000 | 30.0 | Present | 5472.00 | 2.00 | 0.00 | 0.00 | 6.00 | 47.62 | 0.00 | 26.00 |
| Example117 | 2 | 120000 | 30.0 | Present | 9500.00 | 2.00 | 0.00 | 0.00 | 6.00 | 47.62 | 0.00 | 26.00 |
| Example118 | 2 | 120000 | 30.0 | Present | 500.00 | 1.00 | 0.00 | 0.00 | 6.00 | 0.00 | 20.83 | 22.00 |
| Example119 | 2 | 120000 | 30.0 | Present | 500.00 | 0.10 | 0.00 | 0.00 | 6.00 | 47.62 | 0.00 | 18.40 |
| Example120 | 7 | 120000 | 30.0 | Present | 500.00 | 1.00 | 0.00 | 0.00 | 6.00 | 47.62 | 0.00 | 22.00 |
| Example121 | 8 | 120000 | 30.0 | Present | 500.00 | 1.00 | 0.00 | 0.00 | 6.00 | 47.62 | 0.00 | 22.00 |
| Example122 | 4 | 120000 | 30.0 | Present | 500.00 | 1.00 | 0.00 | 0.00 | 6.00 | 47.62 | 0.00 | 22.00 |
| Example123 | 2 | 120000 | 30.0 | Present | 500.00 | 1.00 | 0.00 | 0.00 | 6.00 | 47.62 | 0.00 | 22.00 |
| Example124 | 15 | 120000 | 30.0 | Present | 500.00 | 1.00 | 0.00 | 0.00 | 6.00 | 47.62 | 0.00 | 22.00 |
| Example125 | 16 | 120000 | 30.0 | Present | 500.00 | 1.00 | 0.00 | 0.00 | 6.00 | 47.62 | 0.00 | 22.00 |
| Example126 | 17 | 120000 | 30.0 | Present | 500.00 | 1.00 | 0.00 | 0.00 | 6.00 | 47.62 | 0.00 | 22.00 |
| Example127 | 2 | 120000 | 30.0 | Present | 500.00 | 1.00 | 0.00 | 0.00 | 6.00 | 0.00 | 0.00 | 4.00 |
| Example128 | 15 | 120000 | 30.0 | Present | 500.00 | 1.00 | 0.00 | 0.00 | 6.00 | 47.62 | 0.00 | 22.00 |
| Example129 | 15 | 120000 | 30.0 | Present | 500.00 | 1.00 | 0.00 | 0.00 | 6.00 | 47.62 | 0.00 | 22.00 |
| Example130 | 15 | 120000 | 30.0 | Present | 500.00 | 1.00 | 0.00 | 0.00 | 6.00 | 47.62 | 0.00 | 22.00 |
| Example131 | 15 | 120000 | 30.0 | Present | 500.00 | 1.00 | 0.00 | 0.00 | 6.00 | 47.62 | 0.00 | 22.00 |
| Example132 | 15 | 120000 | 30.0 | Present | 500.00 | 1.00 | 0.00 | 0.00 | 6.00 | 47.62 | 0.00 | 22.00 |

| Treatment solution | pH | [$B_M$ mass]/[$A_M$ mass] |
|---|---|---|
| Example67 | 4.0 | 3.00 |
| Example68 | 4.0 | 0.70 |
| Example69 | 4.0 | 5.50 |
| Example70 | 4.0 | 5.50 |
| Example71 | 4.0 | 5.50 |
| Example72 | 4.0 | 5.48 |
| Example73 | 4.0 | 5.48 |
| Example74 | 4.0 | 5.48 |
| Example75 | 4.0 | 5.48 |
| Example76 | 4.0 | 5.48 |
| Example77 | 4.0 | 5.48 |
| Example78 | 4.0 | 5.48 |
| Example79 | 4.0 | 5.48 |
| Example80 | 4.0 | 5.48 |
| Example81 | 4.0 | 13.71 |
| Example82 | 4.0 | 26.86 |
| Example83 | 4.0 | 30.00 |
| Example84 | 4.0 | 52.08 |
| Example85 | 4.0 | 5.48 |
| Example86 | 4.0 | 54.82 |
| Example87 | 4.0 | 5.48 |
| Example88 | 4.0 | 5.48 |
| Example89 | 4.0 | 5.48 |
| Example90 | 4.0 | 5.48 |
| Example91 | 4.0 | 5.48 |
| Example92 | 4.0 | 5.48 |
| Example93 | 4.0 | 5.48 |
| Example94 | 4.0 | 5.48 |
| Example95 | 4.0 | 5.48 |
| Example96 | 4.0 | 5.48 |
| Example97 | 4.0 | 5.48 |
| Example98 | 4.0 | 5.48 |
| Example99 | 4.0 | 5.48 |
| Example100 | 3.6 | 3.00 |
| Example101 | 3.6 | 0.70 |
| Example102 | 3.6 | 5.50 |
| Example103 | 3.6 | 5.50 |
| Example104 | 3.6 | 5.50 |
| Example105 | 3.6 | 5.48 |
| Example106 | 3.6 | 5.48 |
| Example107 | 3.6 | 5.48 |
| Example108 | 3.6 | 5.48 |
| Example109 | 3.6 | 5.48 |
| Example110 | 3.6 | 5.48 |
| Example111 | 3.6 | 5.48 |
| Example112 | 3.6 | 5.48 |
| Example113 | 3.6 | 5.48 |
| Example114 | 3.6 | 13.71 |
| Example115 | 3.6 | 26.86 |
| Example116 | 3.6 | 30.00 |
| Example117 | 3.6 | 52.08 |
| Example118 | 3.6 | 5.48 |
| Example119 | 3.6 | 54.82 |
| Example120 | 3.6 | 5.48 |
| Example121 | 3.6 | 5.48 |
| Example122 | 3.6 | 5.48 |
| Example123 | 3.6 | 5.48 |

TABLE 2-2-continued

| | | |
|---|---|---|
| Example124 | 3.6 | 5.48 |
| Example125 | 3.6 | 5.48 |
| Example126 | 3.6 | 5.48 |
| Example127 | 3.6 | 5.48 |
| Example128 | 3.6 | 5.48 |
| Example129 | 3.6 | 5.48 |
| Example130 | 3.6 | 5.48 |
| Example131 | 3.6 | 5.48 |
| Example132 | 3.6 | 5.48 |

TABLE 2-3

| | ResinB | | | | Added amount [mmol/L] | | | | | | |
|---|---|---|---|---|---|---|---|---|---|---|---|
| | | | | | Ion (A) | | | Ion (C) | Acid radical (E) | | |
| Treatment solution | Synthesis Example | Molecular weight | Amine value | Presence or absence of cyclohexane ring | Added amount [mg/L] | Zr | Ti | Hf | Al | Nitric acid | MSA | Other HF |
| Example133 | 2 | 120000 | 30.0 | Present | 547.20 | 2.00 | 0.00 | 0.00 | 6.00 | 47.62 | 0.00 | 26.00 |
| Example134 | 2 | 120000 | 30.0 | Present | 510.72 | 8.00 | 0.00 | 0.00 | 6.00 | 47.62 | 0.00 | 50.00 |
| Example135 | 2 | 120000 | 30.0 | Present | 528.00 | 0.00 | 2.00 | 0.00 | 6.00 | 47.62 | 0.00 | 26.00 |
| Example136 | 2 | 120000 | 30.0 | Present | 765.60 | 1.00 | 1.00 | 0.00 | 6.00 | 47.62 | 0.00 | 26.00 |
| Example137 | 2 | 120000 | 30.0 | Present | 1483.35 | 1.00 | 0.00 | 1.00 | 6.00 | 47.62 | 0.00 | 22.00 |
| Example138 | 1 | 70000 | 30.0 | Present | 500.00 | 1.00 | 0.00 | 0.00 | 6.00 | 47.62 | 0.00 | 22.00 |
| Example139 | 2 | 120000 | 30.0 | Present | 500.00 | 1.00 | 0.00 | 0.00 | 6.00 | 47.62 | 0.00 | 22.00 |
| Example140 | 3 | 1200000 | 30.0 | Present | 500.00 | 1.00 | 0.00 | 0.00 | 6.00 | 47.62 | 0.00 | 22.00 |
| Example141 | 9 | 120000 | 14.0 | Present | 500.00 | 1.00 | 0.00 | 0.00 | 6.00 | 47.62 | 0.00 | 22.00 |
| Example142 | 5 | 120000 | 52.0 | Present | 500.00 | 1.00 | 0.00 | 0.00 | 6.00 | 47.62 | 0.00 | 22.00 |
| Example143 | 12 | 120000 | 71.0 | Present | 500.00 | 1.00 | 0.00 | 0.00 | 6.00 | 47.62 | 0.00 | 22.00 |
| Example144 | 13 | 120000 | 4.7 | Present | 500.00 | 1.00 | 0.00 | 0.00 | 6.00 | 47.62 | 0.00 | 22.00 |
| Example145 | 6 | 120000 | 34.0 | Present | 500.00 | 1.00 | 0.00 | 0.00 | 6.00 | 47.62 | 0.00 | 22.00 |
| Example146 | 10 | 120000 | 52.0 | Absent | 500.00 | 1.00 | 0.00 | 0.00 | 6.00 | 47.62 | 0.00 | 22.00 |
| Example147 | 2 | 120000 | 30.0 | Present | 500.00 | 0.40 | 0.00 | 0.00 | 6.00 | 47.62 | 0.00 | 19.60 |
| Example148 | 2 | 120000 | 30.0 | Present | 4900.00 | 2.00 | 0.00 | 0.00 | 6.00 | 47.62 | 0.00 | 26.00 |
| Example149 | 2 | 120000 | 30.0 | Present | 5472.00 | 2.00 | 0.00 | 0.00 | 6.00 | 47.62 | 0.00 | 26.00 |
| Example150 | 2 | 120000 | 30.0 | Present | 9500.00 | 2.00 | 0.00 | 0.00 | 6.00 | 47.62 | 0.00 | 26.00 |
| Example151 | 2 | 120000 | 30.0 | Present | 500.00 | 1.00 | 0.00 | 0.00 | 6.00 | 2.00 | 20.83 | 22.00 |
| Example152 | 2 | 120000 | 30.0 | Present | 500.00 | 0.10 | 0.00 | 0.00 | 6.00 | 47.62 | 0.00 | 18.40 |
| Example153 | 7 | 120000 | 30.0 | Present | 500.00 | 1.00 | 0.00 | 0.00 | 6.00 | 47.62 | 0.00 | 22.00 |
| Example154 | 8 | 120000 | 30.0 | Present | 500.00 | 1.00 | 0.00 | 0.00 | 6.00 | 47.62 | 0.00 | 22.00 |
| Example155 | 4 | 120000 | 30.0 | Present | 500.00 | 1.00 | 0.00 | 0.00 | 6.00 | 47.62 | 0.00 | 22.00 |
| Example156 | 2 | 120000 | 30.0 | Present | 500.00 | 1.00 | 0.00 | 0.00 | 6.00 | 47.62 | 0.00 | 22.00 |
| Example157 | 15 | 120000 | 30.0 | Present | 500.00 | 1.00 | 0.00 | 0.00 | 6.00 | 47.62 | 0.00 | 22.00 |
| Example158 | 16 | 120000 | 30.0 | Present | 500.00 | 1.00 | 0.00 | 0.00 | 6.00 | 47.62 | 0.00 | 22.00 |
| Example159 | 17 | 120000 | 30.0 | Present | 500.00 | 1.00 | 0.00 | 0.00 | 6.00 | 47.62 | 0.00 | 22.00 |
| Example160 | 2 | 120000 | 30.0 | Present | 500.00 | 1.00 | 0.00 | 0.00 | 0.00 | 2.00 | 0.00 | 4.00 |
| Example161 | 15 | 120000 | 30.0 | Present | 500.00 | 1.00 | 0.00 | 0.00 | 6.00 | 47.62 | 0.00 | 22.00 |
| Example162 | 15 | 120000 | 30.0 | Present | 500.00 | 1.00 | 0.00 | 0.00 | 6.00 | 47.62 | 0.00 | 22.00 |
| Example163 | 15 | 120000 | 30.0 | Present | 500.00 | 1.00 | 0.00 | 0.00 | 6.00 | 47.62 | 0.00 | 22.00 |
| Example164 | 15 | 120000 | 30.0 | Present | 500.00 | 1.00 | 0.00 | 0.00 | 6.00 | 47.62 | 0.00 | 22.00 |
| Example165 | 15 | 120000 | 30.0 | Present | 500.00 | 1.00 | 0.00 | 0.00 | 6.00 | 47.62 | 0.00 | 22.00 |
| Example166 | 2 | 120000 | 30.0 | Present | 547.20 | 2.00 | 0.00 | 0.00 | 6.00 | 47.62 | 0.00 | 26.00 |
| Example167 | 2 | 120000 | 30.0 | Present | 510.72 | 8.00 | 0.00 | 0.00 | 6.00 | 47.62 | 0.00 | 50.00 |
| Example168 | 2 | 120000 | 30.0 | Present | 528.00 | 0.00 | 2.00 | 0.00 | 6.00 | 47.62 | 0.00 | 26.00 |
| Example169 | 2 | 120000 | 30.0 | Present | 765.60 | 1.00 | 1.00 | 0.00 | 6.00 | 47.62 | 0.00 | 26.00 |
| Example170 | 2 | 120000 | 30.0 | Present | 1483.35 | 1.00 | 0.00 | 1.00 | 6.00 | 47.62 | 0.00 | 22.00 |
| Example171 | 1 | 70000 | 30.0 | Present | 500.00 | 1.00 | 0.00 | 0.00 | 6.00 | 47.62 | 0.00 | 22.00 |
| Example172 | 2 | 120000 | 30.0 | Present | 500.00 | 1.00 | 0.00 | 0.00 | 6.00 | 47.62 | 0.00 | 22.00 |
| Example173 | 3 | 1200000 | 30.0 | Present | 500.00 | 1.00 | 0.00 | 0.00 | 6.00 | 47.62 | 0.00 | 22.00 |
| Example174 | 9 | 120000 | 14.0 | Present | 500.00 | 1.00 | 0.00 | 0.00 | 6.00 | 47.62 | 0.00 | 22.00 |
| Example175 | 5 | 120000 | 52.0 | Present | 500.00 | 1.00 | 0.00 | 0.00 | 6.00 | 47.62 | 0.00 | 22.00 |
| Example176 | 12 | 120000 | 71.0 | Present | 500.00 | 1.00 | 0.00 | 0.00 | 6.00 | 47.62 | 0.00 | 22.00 |
| Example177 | 13 | 120000 | 4.7 | Present | 500.00 | 1.00 | 0.00 | 0.00 | 6.00 | 47.62 | 0.00 | 22.00 |
| Example178 | 6 | 120000 | 34.0 | Present | 500.00 | 1.00 | 0.00 | 0.00 | 6.00 | 47.62 | 0.00 | 22.00 |
| Example179 | 10 | 120000 | 52.0 | Absent | 500.00 | 1.00 | 0.00 | 0.00 | 6.00 | 47.62 | 0.00 | 22.00 |
| Example180 | 2 | 120000 | 30.0 | Present | 500.00 | 0.40 | 0.00 | 0.00 | 6.00 | 47.62 | 0.00 | 19.60 |
| Example181 | 2 | 120000 | 30.0 | Present | 4900.00 | 2.00 | 0.00 | 0.00 | 6.00 | 47.62 | 0.00 | 26.00 |
| Example182 | 2 | 120000 | 30.0 | Present | 5472.00 | 2.00 | 0.00 | 0.00 | 6.00 | 47.62 | 0.00 | 26.00 |
| Example183 | 2 | 120000 | 30.0 | Present | 9500.00 | 2.00 | 0.00 | 0.00 | 6.00 | 47.62 | 0.00 | 26.00 |
| Example184 | 2 | 120000 | 30.0 | Present | 500.00 | 1.00 | 0.00 | 0.00 | 6.00 | 2.00 | 20.83 | 22.00 |
| Example185 | 2 | 120000 | 30.0 | Present | 500.00 | 0.10 | 0.00 | 0.00 | 6.00 | 47.62 | 0.00 | 18.40 |
| Example186 | 7 | 120000 | 30.0 | Present | 500.00 | 1.00 | 0.00 | 0.00 | 6.00 | 47.62 | 0.00 | 22.00 |
| Example187 | 8 | 120000 | 30.0 | Present | 500.00 | 1.00 | 0.00 | 0.00 | 6.00 | 47.62 | 0.00 | 22.00 |

TABLE 2-3-continued

| | | | | | | | | | | | | |
|---|---|---|---|---|---|---|---|---|---|---|---|---|
| Example188 | 4 | 120000 | 30.0 | Present | 500.00 | 1.00 | 0.00 | 0.00 | 6.00 | 47.62 | 0.00 | 22.00 |
| Example189 | 2 | 120000 | 30.0 | Present | 500.00 | 1.00 | 0.00 | 0.00 | 6.00 | 47.62 | 0.00 | 22.00 |
| Example190 | 15 | 120000 | 30.0 | Present | 500.00 | 1.00 | 0.00 | 0.00 | 6.00 | 47.62 | 0.00 | 22.00 |
| Example191 | 16 | 120000 | 30.0 | Present | 500.00 | 1.00 | 0.00 | 0.00 | 6.00 | 47.62 | 0.00 | 22.00 |
| Example192 | 17 | 120000 | 30.0 | Present | 500.00 | 1.00 | 0.00 | 0.00 | 6.00 | 47.62 | 0.00 | 22.00 |
| Example193 | 2 | 120000 | 30.0 | Present | 500.00 | 1.00 | 0.00 | 0.00 | 6.00 | 2.00 | 0.00 | 4.00 |
| Example194 | 15 | 120000 | 30.0 | Present | 500.00 | 1.00 | 0.00 | 0.00 | 6.00 | 47.62 | 0.00 | 22.00 |
| Example195 | 15 | 120000 | 30.0 | Present | 500.00 | 1.00 | 0.00 | 0.00 | 6.00 | 47.62 | 0.00 | 22.00 |
| Example196 | 15 | 120000 | 30.0 | Present | 500.00 | 1.00 | 0.00 | 0.00 | 6.00 | 47.62 | 0.00 | 22.00 |
| Example197 | 15 | 120000 | 30.0 | Present | 500.00 | 1.00 | 0.00 | 0.00 | 6.00 | 47.62 | 0.00 | 22.00 |
| Example198 | 15 | 120000 | 30.0 | Present | 500.00 | 1.00 | 0.00 | 0.00 | 6.00 | 47.62 | 0.00 | 22.00 |

| Treatment solution | pH | $[B_M\ mass]/[A_M\ mass]$ |
|---|---|---|
| Example133 | 4.0 | 3.00 |
| Example134 | 4.0 | 0.70 |
| Example135 | 4.0 | 5.50 |
| Example136 | 4.0 | 5.50 |
| Example137 | 4.0 | 5.50 |
| Example138 | 4.0 | 5.48 |
| Example139 | 4.0 | 5.48 |
| Example140 | 4.0 | 5.48 |
| Example141 | 4.0 | 5.48 |
| Example142 | 4.0 | 5.48 |
| Example143 | 4.0 | 5.48 |
| Example144 | 4.0 | 5.48 |
| Example145 | 4.0 | 5.48 |
| Example146 | 4.0 | 5.48 |
| Example147 | 4.0 | 13.71 |
| Example148 | 4.0 | 26.86 |
| Example149 | 4.0 | 30.00 |
| Example150 | 4.0 | 52.08 |
| Example151 | 4.0 | 5.48 |
| Example152 | 4.0 | 54.82 |
| Example153 | 4.0 | 5.48 |
| Example154 | 4.0 | 5.48 |
| Example155 | 4.0 | 5.48 |
| Example156 | 4.0 | 5.48 |
| Example157 | 4.0 | 5.48 |
| Example158 | 4.0 | 5.48 |
| Example159 | 4.0 | 5.48 |
| Example160 | 4.0 | 5.48 |
| Example161 | 4.0 | 5.48 |
| Example162 | 4.0 | 5.48 |
| Example163 | 4.0 | 5.48 |
| Example164 | 4.0 | 5.48 |
| Example165 | 4.0 | 5.48 |
| Example166 | 3.6 | 3.00 |
| Example167 | 3.6 | 0.70 |
| Example168 | 3.6 | 5.50 |
| Example169 | 3.6 | 5.50 |
| Example170 | 3.6 | 5.50 |
| Example171 | 3.6 | 5.48 |
| Example172 | 3.6 | 5.48 |
| Example173 | 3.6 | 5.48 |
| Example174 | 3.6 | 5.48 |
| Example175 | 3.6 | 5.48 |
| Example176 | 3.6 | 5.48 |
| Example177 | 3.6 | 5.48 |
| Example178 | 3.6 | 5.48 |
| Example179 | 3.6 | 5.48 |
| Example180 | 3.6 | 13.71 |
| Example181 | 3.6 | 26.86 |
| Example182 | 3.6 | 30.00 |
| Example183 | 3.6 | 52.08 |
| Example184 | 3.6 | 5.48 |
| Example185 | 3.6 | 54.82 |
| Example186 | 3.6 | 5.48 |
| Example187 | 3.6 | 5.48 |
| Example188 | 3.6 | 5.48 |
| Example189 | 3.6 | 5.48 |
| Example190 | 3.6 | 5.48 |
| Example191 | 3.6 | 5.48 |
| Example192 | 3.6 | 5.48 |
| Example193 | 3.6 | 5.48 |
| Example194 | 3.6 | 5.48 |

TABLE 2-3-continued

|  | Example195 | 3.6 | 5.48 |
|---|---|---|---|
|  | Example196 | 3.6 | 5.48 |
|  | Example197 | 3.6 | 5.48 |
|  | Example198 | 3.6 | 5.48 |

TABLE 2-4

| Treatment solution | ResinB | | | | Added amount [mg/L] | Added amount [mmol/L] | | | | | | |
|---|---|---|---|---|---|---|---|---|---|---|---|---|
| | Synthesis Example | Molecular weight | Amine value | Presence or absence of cyclohexane ring | | Ion (A) | | | Ion (C) | Acid radical (E) | | |
| | | | | | | Zr | Ti | Hf | Al | Nitric acid | MSA | Other HF |
| Example199 | 2 | 120000 | 30.0 | Present | 547.20 | 2.00 | 0.00 | 0.00 | 6.00 | 47.62 | 0.00 | 26.00 |
| Example200 | 2 | 120000 | 30.0 | Present | 510.72 | 8.00 | 0.00 | 0.00 | 6.00 | 47.62 | 0.00 | 50.00 |
| Example201 | 2 | 120000 | 30.0 | Present | 528.00 | 0.00 | 2.00 | 0.00 | 6.00 | 47.62 | 0.00 | 26.00 |
| Example202 | 2 | 120000 | 30.0 | Present | 765.60 | 1.00 | 1.00 | 0.00 | 6.00 | 47.62 | 0.00 | 26.00 |
| Example203 | 2 | 120000 | 30.0 | Present | 1483.35 | 1.00 | 0.00 | 1.00 | 6.00 | 47.62 | 0.00 | 22.00 |
| Example204 | 1 | 70000 | 30.0 | Present | 500.00 | 1.00 | 0.00 | 0.00 | 6.00 | 47.62 | 0.00 | 22.00 |
| Example205 | 2 | 120000 | 30.0 | Present | 500.00 | 1.00 | 0.00 | 0.00 | 6.00 | 47.62 | 0.00 | 22.00 |
| Example206 | 3 | 1200000 | 30.0 | Present | 500.00 | 1.00 | 0.00 | 0.00 | 6.00 | 47.62 | 0.00 | 22.00 |
| Example207 | 9 | 120000 | 14.0 | Present | 500.00 | 1.00 | 0.00 | 0.00 | 6.00 | 47.62 | 0.00 | 22.00 |
| Example208 | 5 | 120000 | 52.0 | Present | 500.00 | 1.00 | 0.00 | 0.00 | 6.00 | 47.62 | 0.00 | 22.00 |
| Example209 | 12 | 120000 | 71.0 | Present | 500.00 | 1.00 | 0.00 | 0.00 | 6.00 | 47.62 | 0.00 | 22.00 |
| Example210 | 13 | 120000 | 4.7 | Present | 500.00 | 1.00 | 0.00 | 0.00 | 6.00 | 47.62 | 0.00 | 22.00 |
| Example211 | 6 | 120000 | 34.0 | Present | 500.00 | 1.00 | 0.00 | 0.00 | 6.00 | 47.62 | 0.00 | 22.00 |
| Example212 | 10 | 120000 | 52.0 | Absent | 500.00 | 1.00 | 0.00 | 0.00 | 6.00 | 47.62 | 0.00 | 22.00 |
| Example213 | 2 | 120000 | 30.0 | Present | 500.00 | 0.40 | 0.00 | 0.00 | 6.00 | 47.62 | 0.00 | 19.60 |
| Example214 | 2 | 120000 | 30.0 | Present | 4900.00 | 2.00 | 0.00 | 0.00 | 6.00 | 47.62 | 0.00 | 26.00 |
| Example215 | 2 | 120000 | 30.0 | Present | 5472.00 | 2.00 | 0.00 | 0.00 | 6.00 | 47.62 | 0.00 | 26.00 |
| Example216 | 2 | 120000 | 30.0 | Present | 9500.00 | 2.00 | 0.00 | 0.00 | 6.00 | 47.62 | 0.00 | 26.00 |
| Example217 | 2 | 120000 | 30.0 | Present | 500.00 | 1.00 | 0.00 | 0.00 | 6.00 | 0.00 | 20.83 | 22.00 |
| Example218 | 2 | 120000 | 30.0 | Present | 500.00 | 0.10 | 0.00 | 0.00 | 6.00 | 47.62 | 0.00 | 18.40 |
| Example219 | 7 | 120000 | 30.0 | Present | 500.00 | 1.00 | 0.00 | 0.00 | 6.00 | 47.62 | 0.00 | 22.00 |
| Example220 | 8 | 120000 | 30.0 | Present | 500.00 | 1.00 | 0.00 | 0.00 | 6.00 | 47.62 | 0.00 | 22.00 |
| Example221 | 4 | 120000 | 30.0 | Present | 500.00 | 1.00 | 0.00 | 0.00 | 6.00 | 47.62 | 0.00 | 22.00 |
| Example222 | 2 | 120000 | 30.0 | Present | 500.00 | 1.00 | 0.00 | 0.00 | 6.00 | 47.62 | 0.00 | 22.00 |
| Example223 | 15 | 120000 | 30.0 | Present | 500.00 | 1.00 | 0.00 | 0.00 | 6.00 | 47.62 | 0.00 | 22.00 |
| Example224 | 16 | 120000 | 30.0 | Present | 500.00 | 1.00 | 0.00 | 0.00 | 6.00 | 47.62 | 0.00 | 22.00 |
| Example225 | 17 | 120000 | 30.0 | Present | 500.00 | 1.00 | 0.00 | 0.00 | 6.00 | 47.62 | 0.00 | 22.00 |
| Example226 | 2 | 120000 | 30.0 | Present | 500.00 | 1.00 | 0.00 | 0.00 | 0.00 | 0.00 | 0.00 | 4.00 |
| Example227 | 15 | 120000 | 30.0 | Present | 500.00 | 1.00 | 0.00 | 0.00 | 6.00 | 47.62 | 0.00 | 22.00 |
| Example228 | 15 | 120000 | 30.0 | Present | 500.00 | 1.00 | 0.00 | 0.00 | 6.00 | 47.62 | 0.00 | 22.00 |
| Example229 | 15 | 120000 | 30.0 | Present | 500.00 | 1.00 | 0.00 | 0.00 | 6.00 | 47.62 | 0.00 | 22.00 |
| Example230 | 15 | 120000 | 30.0 | Present | 500.00 | 1.00 | 0.00 | 0.00 | 6.00 | 47.62 | 0.00 | 22.00 |
| Example231 | 15 | 120000 | 30.0 | Present | 500.00 | 1.00 | 0.00 | 0.00 | 6.00 | 47.62 | 0.00 | 22.00 |
| Example232 | 2 | 120000 | 30.0 | Present | 547.20 | 2.00 | 0.00 | 0.00 | 6.00 | 47.62 | 0.00 | 26.00 |
| Example233 | 2 | 120000 | 30.0 | Present | 510.72 | 8.00 | 0.00 | 0.00 | 6.00 | 47.62 | 0.00 | 50.00 |
| Example234 | 2 | 120000 | 30.0 | Present | 528.00 | 0.00 | 2.00 | 0.00 | 6.00 | 47.62 | 0.00 | 26.00 |
| Example235 | 2 | 120000 | 30.0 | Present | 765.60 | 1.00 | 1.00 | 0.00 | 6.00 | 47.62 | 0.00 | 26.00 |
| Example236 | 2 | 120000 | 30.0 | Present | 1483.35 | 1.00 | 0.00 | 1.00 | 6.00 | 47.62 | 0.00 | 22.00 |
| Example237 | 1 | 70000 | 30.0 | Present | 500.00 | 1.00 | 0.00 | 0.00 | 6.00 | 47.62 | 0.00 | 22.00 |
| Example238 | 2 | 120000 | 30.0 | Present | 500.00 | 1.00 | 0.00 | 0.00 | 6.00 | 47.62 | 0.00 | 22.00 |
| Example239 | 3 | 1200000 | 30.0 | Present | 500.00 | 1.00 | 0.00 | 0.00 | 6.00 | 47.62 | 0.00 | 22.00 |
| Example240 | 9 | 120000 | 14.0 | Present | 500.00 | 1.00 | 0.00 | 0.00 | 6.00 | 47.62 | 0.00 | 22.00 |
| Example241 | 5 | 120000 | 52.0 | Present | 500.00 | 1.00 | 0.00 | 0.00 | 6.00 | 47.62 | 0.00 | 22.00 |
| Example242 | 12 | 120000 | 71.0 | Present | 500.00 | 1.00 | 0.00 | 0.00 | 6.00 | 47.62 | 0.00 | 22.00 |
| Example243 | 13 | 120000 | 4.7 | Present | 500.00 | 1.00 | 0.00 | 0.00 | 6.00 | 47.62 | 0.00 | 22.00 |
| Example244 | 6 | 120000 | 34.0 | Present | 500.00 | 1.00 | 0.00 | 0.00 | 6.00 | 47.62 | 0.00 | 22.00 |
| Example245 | 10 | 120000 | 52.0 | Absent | 500.00 | 1.00 | 0.00 | 0.00 | 6.00 | 47.62 | 0.00 | 22.00 |
| Example246 | 2 | 120000 | 30.0 | Present | 500.00 | 0.40 | 0.00 | 0.00 | 6.00 | 47.62 | 0.00 | 19.60 |
| Example247 | 2 | 120000 | 30.0 | Present | 4900.00 | 2.00 | 0.00 | 0.00 | 6.00 | 47.62 | 0.00 | 26.00 |
| Example248 | 2 | 120000 | 30.0 | Present | 5472.00 | 2.00 | 0.00 | 0.00 | 6.00 | 47.62 | 0.00 | 26.00 |
| Example249 | 2 | 120000 | 30.0 | Present | 9500.00 | 2.00 | 0.00 | 0.00 | 6.00 | 47.62 | 0.00 | 26.00 |
| Example250 | 2 | 120000 | 30.0 | Present | 500.00 | 1.00 | 0.00 | 0.00 | 6.00 | 0.00 | 20.83 | 22.00 |
| Example251 | 2 | 120000 | 30.0 | Present | 500.00 | 0.10 | 0.00 | 0.00 | 6.00 | 47.62 | 0.00 | 18.40 |
| Example252 | 7 | 120000 | 30.0 | Present | 500.00 | 1.00 | 0.00 | 0.00 | 6.00 | 47.62 | 0.00 | 22.00 |
| Example253 | 8 | 120000 | 30.0 | Present | 500.00 | 1.00 | 0.00 | 0.00 | 6.00 | 47.62 | 0.00 | 22.00 |
| Example254 | 4 | 120000 | 30.0 | Present | 500.00 | 1.00 | 0.00 | 0.00 | 6.00 | 47.62 | 0.00 | 22.00 |
| Example255 | 2 | 120000 | 30.0 | Present | 500.00 | 1.00 | 0.00 | 0.00 | 6.00 | 47.62 | 0.00 | 22.00 |
| Example256 | 15 | 120000 | 30.0 | Present | 500.00 | 1.00 | 0.00 | 0.00 | 6.00 | 47.62 | 0.00 | 22.00 |
| Example257 | 16 | 120000 | 30.0 | Present | 500.00 | 1.00 | 0.00 | 0.00 | 6.00 | 47.62 | 0.00 | 22.00 |
| Example258 | 17 | 120000 | 30.0 | Present | 500.00 | 1.00 | 0.00 | 0.00 | 6.00 | 47.62 | 0.00 | 22.00 |
| Example259 | 2 | 120000 | 30.0 | Present | 500.00 | 1.00 | 0.00 | 0.00 | 0.00 | 0.00 | 0.00 | 4.00 |

TABLE 2-4-continued

| | | | | | | | | | | | | |
|---|---|---|---|---|---|---|---|---|---|---|---|---|
| Example260 | 15 | 120000 | 30.0 | Present | 500.00 | 1.00 | 0.00 | 0.00 | 6.00 | 47.62 | 0.00 | 22.00 |
| Example261 | 15 | 120000 | 30.0 | Present | 500.00 | 1.00 | 0.00 | 0.00 | 6.00 | 47.62 | 0.00 | 22.00 |
| Example262 | 15 | 120000 | 30.0 | Present | 500.00 | 1.00 | 0.00 | 0.00 | 6.00 | 47.62 | 0.00 | 22.00 |
| Example263 | 15 | 120000 | 30.0 | Present | 500.00 | 1.00 | 0.00 | 0.00 | 6.00 | 47.62 | 0.00 | 22.00 |
| Example264 | 15 | 120000 | 30.0 | Present | 500.00 | 1.00 | 0.00 | 0.00 | 6.00 | 47.62 | 0.00 | 22.00 |

| Treatment solution | pH | $[B_M\ mass]/[A_M\ mass]$ |
|---|---|---|
| Example199 | 4.0 | 3.00 |
| Example200 | 4.0 | 0.70 |
| Example201 | 4.0 | 5.50 |
| Example202 | 4.0 | 5.50 |
| Example203 | 4.0 | 5.50 |
| Example204 | 4.0 | 5.48 |
| Example205 | 4.0 | 5.48 |
| Example206 | 4.0 | 5.48 |
| Example207 | 4.0 | 5.48 |
| Example208 | 4.0 | 5.48 |
| Example209 | 4.0 | 5.48 |
| Example210 | 4.0 | 5.48 |
| Example211 | 4.0 | 5.48 |
| Example212 | 4.0 | 5.48 |
| Example213 | 4.0 | 13.71 |
| Example214 | 4.0 | 26.86 |
| Example215 | 4.0 | 30.00 |
| Example216 | 4.0 | 52.08 |
| Example217 | 4.0 | 5.48 |
| Example218 | 4.0 | 54.82 |
| Example219 | 4.0 | 5.48 |
| Example220 | 4.0 | 5.48 |
| Example221 | 4.0 | 5.48 |
| Example222 | 4.0 | 5.48 |
| Example223 | 4.0 | 5.48 |
| Example224 | 4.0 | 5.48 |
| Example225 | 4.0 | 5.48 |
| Example226 | 4.0 | 5.48 |
| Example227 | 4.0 | 5.48 |
| Example228 | 4.0 | 5.48 |
| Example229 | 4.0 | 5.48 |
| Example230 | 4.0 | 5.48 |
| Example231 | 4.0 | 5.48 |
| Example232 | 3.6 | 3.00 |
| Example233 | 3.6 | 0.70 |
| Example234 | 3.6 | 5.50 |
| Example235 | 3.6 | 5.50 |
| Example236 | 3.6 | 5.50 |
| Example237 | 3.6 | 5.48 |
| Example238 | 3.6 | 5.48 |
| Example239 | 3.6 | 5.48 |
| Example240 | 3.6 | 5.48 |
| Example241 | 3.6 | 5.48 |
| Example242 | 3.6 | 5.48 |
| Example243 | 3.6 | 5.48 |
| Example244 | 3.6 | 5.48 |
| Example245 | 3.6 | 5.48 |
| Example246 | 3.6 | 13.71 |
| Example247 | 3.6 | 26.86 |
| Example248 | 3.6 | 30.00 |
| Example249 | 3.6 | 52.08 |
| Example250 | 3.6 | 5.48 |
| Example251 | 3.6 | 54.82 |
| Example252 | 3.6 | 5.48 |
| Example253 | 3.6 | 5.48 |
| Example254 | 3.6 | 5.48 |
| Example255 | 3.6 | 5.48 |
| Example256 | 3.6 | 5.48 |
| Example257 | 3.6 | 5.48 |
| Example258 | 3.6 | 5.48 |
| Example259 | 3.6 | 5.48 |
| Example260 | 3.6 | 5.48 |
| Example261 | 3.6 | 5.48 |
| Example262 | 3.6 | 5.48 |
| Example263 | 3.6 | 5.48 |
| Example264 | 3.6 | 5.48 |

TABLE 2-5

| Treatment solution | ResinB | | | Added amount [mg/L] | Added amount [mmol/L] | | | | | | |
| --- | --- | --- | --- | --- | --- | --- | --- | --- | --- | --- | --- |
| | Synthesis Example | Molecular weight | Amine value | Presence or absence of cyclohexane ring | | Ion (A) | | | Ion (C) | Acid radical(E) | |
| | | | | | | Zr | Ti | Hf | Al | Nitric acid | MSA | Other HF |

| Treatment solution | Synthesis Example | Molecular weight | Amine value | Presence or absence of cyclohexane ring | Added amount [mg/L] | Zr | Ti | Hf | Al | Nitric acid | MSA | HF |
| --- | --- | --- | --- | --- | --- | --- | --- | --- | --- | --- | --- | --- |
| Comparative Example1 | — | | | | 0.00 | 2.00 | 0.00 | 0.00 | 6.00 | 47.62 | 0.00 | 18.00 |
| Comparative Example2 | 2 | 120000 | 30.0 | Present | 500.00 | 0.00 | 0.00 | 0.00 | 6.00 | 47.62 | 0.00 | 18.00 |
| Comparative Example3 | 2 | 120000 | 30.0 | Present | 127.68 | 2.00 | 0.00 | 0.00 | 6.00 | 47.62 | 0.00 | 18.00 |
| Comparative Example4 | 2 | 120000 | 30.0 | Present | 11673.60 | 8.00 | 0.00 | 0.00 | 6.00 | 47.62 | 0.00 | 18.00 |
| Comparative Example5 | 14 | 30000 | 30.0 | Present | 500.00 | 1.00 | 0.00 | 0.00 | 6.00 | 47.62 | 0.00 | 18.00 |
| Comparative Example6 | 2 | 120000 | 30.0 | Present | 500.00 | #### | 0.00 | 0.00 | 6.00 | 47.62 | 0.00 | 18.00 |
| Comparative Example7 | 2 | 120000 | 30.0 | Present | 500.00 | 0.03 | 0.00 | 0.00 | 6.00 | 47.62 | 0.00 | 18.00 |
| Comparative Example8 | 11 | 120000 | 45.0 | Present | 500.00 | 1.00 | 0.00 | 0.00 | 6.00 | 47.62 | 0.00 | 18.00 |
| Comparative Example9 | 18 | 120000 | 45.0 | Present | 500.00 | 1.00 | 0.00 | 0.00 | 6.00 | 47.62 | 0.00 | 18.00 |
| Comparative Example10 | — | | | | 0.00 | 1.00 | 0.00 | 0.00 | 6.00 | 47.62 | 0.00 | 18.00 |

| Treatment solution | pH | [$B_M$ mass]/[$A_M$ mass] |
| --- | --- | --- |
| Comparative Example1 | 4.0 | 0.00 |
| Comparative Example2 | 4.0 | — |
| Comparative Example3 | 4.0 | 0.70 |
| Comparative Example4 | 4.0 | 64.00 |
| Comparative Example5 | 4.0 | 5.48 |
| Comparative Example6 | 4.0 | 0.55 |
| Comparative Example7 | 4.0 | 182.75 |
| Comparative Example8 | 4.0 | 5.48 |
| Comparative Example9 | 4.0 | 5.48 |
| Comparative Example10 | 4.0 | 0.00 |

<Pretreatment of Metal Materials>

Metal materials (SPCC: cold-rolled steel sheet, and SGCC: hot-dip zinc-coated steel sheet) were immersed in an alkali degreasing agent [a solution obtained by mixing agent A and agent B of FINE CLEANER E2093 (manufactured by Nihon Parkerizing Co., Ltd.) with water at concentrations of 13 g/L and 11 g/L, respectively] at 45° C. for 2 minutes to remove oil and dirt from the surface of each metal material. Then, the surface of each metal material was washed with water.

Next, the thus water-washed metal materials were immersed in metal surface treatment agents (the respective metal surface treatment agents of Examples 1 to 264 and Comparative Examples 1 to 10) at 40° C. for 2 minutes.

After the water-wash of the metal materials immersed in the respective metal surface treatment agents, 180-second constant-voltage cathodic electrolysis was subsequently performed using an electrodeposition coating agent (GT-100, manufactured by Kansai Paint Co., Ltd.) with each metal material being set as a cathode, thereby allowing a coating film component to precipitate on the entire surface of each metal material. Thereafter, the metal materials were washed with water and then baked at 170° C. (PMT: highest temperature of each metal material during baking) for 20 minutes to prepare test pieces, and the following evaluations were performed. It is noted here that the coating film's thickness was adjusted to be 20 μm.

[Evaluation of Test Pieces]

<Corrosion Resistance>

In order to verify the corrosion resistance of the test pieces (test pieces of No. 1 to 274) at their edges, the test pieces were each set in a composite cycle tester, and a composite cycle test was conducted in accordance with JASO-M609-91 for 100 cycles. After the 100 cycles, the maximum blister width from a burr generated at the time of cutting was measured, and the corrosion resistance was evaluated based on the following evaluation criteria. The results thereof are shown in Tables 3-1 to 3-5.

(Evaluation Criteria)

S: The maximum blister width was less than 1.5 mm.

A: The maximum blister width was 1.5 mm to less than 2.5 mm.

B: The maximum blister width was 2.5 mm to less than 5.0 mm.

C: The maximum blister width was 5.0 mm or greater.

<Adhesion Performance>

In order to verify the coating film adhesion performance of the test pieces (test pieces of Nos. 1 to 274), cuts were made on each test piece in a grid form at 1-mm intervals (10×10=100 cuts), and each test piece was subsequently immersed in boiling water for 1 hour. Thereafter, water on the surface was wiped off and a cellophane tape was pasted to the grid-form cuts, after which the cellophane tape was peeled off, and the number of grids where the coating film was not removed was measured to evaluate the adhesion performance based on the following evaluation criteria. The results thereof are shown in Tables 3-1 to 3-5.

(Evaluation Criteria)

A: The number of grids where the coating film was not removed was 100.

B: The number of grids where the coating film was not removed was 80 to 99.

C: The number of grids where the coating film was not removed was 79 or less.

TABLE 3-1

| Test piece | Steel sheet | Treatment solution | Corrosion resistance | Adhesion performance |
|---|---|---|---|---|
| 1 | SPCC | Example1 | S | A |
| 2 | SPCC | Example2 | S | A |
| 3 | SPCC | Example3 | S | A |
| 4 | SPCC | Example4 | S | A |
| 5 | SPCC | Example5 | S | A |
| 6 | SPCC | Example6 | A | A |
| 7 | SPCC | Example7 | S | A |
| 8 | SPCC | Example8 | S | A |
| 9 | SPCC | Example9 | S | A |
| 10 | SPCC | Example10 | A | B |
| 11 | SPCC | Example11 | B | A |
| 12 | SPCC | Example12 | B | B |
| 13 | SPCC | Example13 | S | A |
| 14 | SPCC | Example14 | B | A |
| 15 | SPCC | Example15 | S | A |
| 16 | SPCC | Example16 | S | A |
| 17 | SPCC | Example17 | B | A |
| 18 | SPCC | Example18 | B | A |
| 19 | SPCC | Example19 | S | A |
| 20 | SPCC | Example20 | B | A |
| 21 | SPCC | Example21 | S | A |
| 22 | SPCC | Example22 | S | A |
| 23 | SPCC | Example23 | S | A |
| 24 | SGCC | Example24 | S | A |
| 25 | SPCC | Example25 | A | A |
| 26 | SPCC | Example26 | S | A |
| 27 | SPCC | Example27 | S | A |
| 28 | SPCC | Example28 | S | A |
| 29 | SPCC | Example29 | S | A |
| 30 | SPCC | Example30 | S | A |
| 31 | SPCC | Example31 | S | A |
| 32 | SPCC | Example32 | S | A |
| 33 | SPCC | Example33 | S | A |
| 34 | SPCC | Example34 | S | A |
| 35 | SPCC | Example35 | S | A |
| 36 | SPCC | Example36 | S | A |
| 37 | SPCC | Example37 | S | A |
| 38 | SPCC | Example38 | S | A |
| 39 | SPCC | Example39 | A | A |

TABLE 3-1-continued

| Test piece | Steel sheet | Treatment solution | Corrosion resistance | Adhesion performance |
|---|---|---|---|---|
| 40 | SPCC | Example40 | S | A |
| 41 | SPCC | Example41 | S | A |
| 42 | SPCC | Example42 | S | A |
| 43 | SPCC | Example43 | A | B |
| 44 | SPCC | Example44 | B | A |
| 45 | SPCC | Example45 | B | B |
| 46 | SPCC | Example46 | S | A |
| 47 | SPCC | Example47 | B | A |
| 48 | SPCC | Example48 | S | A |
| 49 | SPCC | Example49 | S | A |
| 50 | SPCC | Example50 | B | A |
| 51 | SPCC | Example51 | B | A |
| 52 | SPCC | Example52 | S | A |
| 53 | SPCC | Example53 | B | A |
| 54 | SPCC | Example54 | S | A |
| 55 | SPCC | Example55 | S | A |
| 56 | SPCC | Example56 | S | A |
| 57 | SGCC | Example57 | S | A |
| 58 | SPCC | Example58 | A | A |
| 59 | SPCC | Example59 | S | A |
| 60 | SPCC | Example60 | S | A |
| 61 | SPCC | Example61 | S | A |
| 62 | SPCC | Example62 | S | A |
| 63 | SPCC | Example63 | S | A |
| 64 | SPCC | Example64 | S | A |
| 65 | SPCC | Example65 | S | A |
| 66 | SPCC | Example66 | S | A |

TABLE 3-2

| Test piece | Steel sheet | Treatment solution | Corrosion resistance | Adhesion performance |
|---|---|---|---|---|
| 67 | SPCC | Example67 | S | A |
| 68 | SPCC | Example68 | S | A |
| 69 | SPCC | Example69 | S | A |
| 70 | SPCC | Example70 | S | A |
| 71 | SPCC | Example71 | S | A |
| 72 | SPCC | Example72 | A | A |
| 73 | SPCC | Example73 | S | A |
| 74 | SPCC | Example74 | S | A |
| 75 | SPCC | Example75 | S | A |
| 76 | SPCC | Example76 | A | B |
| 77 | SPCC | Example77 | B | A |
| 78 | SPCC | Example78 | B | B |
| 79 | SPCC | Example79 | S | A |
| 80 | SPCC | Example80 | B | A |
| 81 | SPCC | Example81 | S | A |
| 82 | SPCC | Example82 | S | A |
| 83 | SPCC | Example83 | B | A |
| 84 | SPCC | Example84 | B | A |
| 85 | SPCC | Example85 | S | A |
| 86 | SPCC | Example86 | B | A |
| 87 | SPCC | Example87 | S | A |
| 88 | SPCC | Example88 | S | A |
| 89 | SPCC | Example89 | S | A |
| 90 | SGCC | Example90 | S | A |
| 91 | SPCC | Example91 | A | A |
| 92 | SPCC | Example92 | S | A |
| 93 | SPCC | Example93 | S | A |
| 94 | SPCC | Example94 | S | A |
| 95 | SPCC | Example95 | S | A |
| 96 | SPCC | Example96 | S | A |
| 97 | SPCC | Example97 | S | A |
| 98 | SPCC | Example98 | S | A |
| 99 | SPCC | Example99 | S | A |
| 100 | SPCC | Example100 | S | A |
| 101 | SPCC | Example101 | S | A |
| 102 | SPCC | Example102 | S | A |
| 103 | SPCC | Example103 | S | A |
| 104 | SPCC | Example104 | S | A |
| 105 | SPCC | Example105 | A | A |
| 106 | SPCC | Example106 | S | A |
| 107 | SPCC | Example107 | S | A |

TABLE 3-2-continued

| Test piece | Steel sheet | Treatment solution | Corrosion resistance | Adhesion performance |
|---|---|---|---|---|
| 108 | SPCC | Example108 | S | A |
| 109 | SPCC | Example109 | A | B |
| 110 | SPCC | Example110 | B | A |
| 111 | SPCC | Example111 | B | B |
| 112 | SPCC | Example112 | S | A |
| 113 | SPCC | Example113 | B | A |
| 114 | SPCC | Example114 | S | A |
| 115 | SPCC | Example115 | S | A |
| 116 | SPCC | Example116 | B | A |
| 117 | SPCC | Example117 | B | A |
| 118 | SPCC | Example118 | S | A |
| 119 | SPCC | Example119 | B | A |
| 120 | SPCC | Example120 | S | A |
| 121 | SPCC | Example121 | S | A |
| 122 | SPCC | Example122 | S | A |
| 123 | SGCC | Example123 | S | A |
| 124 | SPCC | Example124 | A | A |
| 125 | SPCC | Example125 | S | A |
| 126 | SPCC | Example126 | S | A |
| 127 | SPCC | Example127 | S | A |
| 128 | SPCC | Example128 | S | A |
| 129 | SPCC | Example129 | S | A |
| 130 | SPCC | Example130 | S | A |
| 131 | SPCC | Example131 | S | A |
| 132 | SPCC | Example132 | S | A |

TABLE 3-3

| Test piece | Steel sheet | Treatment solution | Corrosion resistance | Adhesion performance |
|---|---|---|---|---|
| 133 | SPCC | Example133 | S | A |
| 134 | SPCC | Example134 | S | A |
| 135 | SPCC | Example135 | S | A |
| 136 | SPCC | Example136 | S | A |
| 137 | SPCC | Example137 | S | A |
| 138 | SPCC | Example138 | A | A |
| 139 | SPCC | Example139 | S | A |
| 140 | SPCC | Example140 | S | A |
| 141 | SPCC | Example141 | S | A |
| 142 | SPCC | Example142 | A | B |
| 143 | SPCC | Example143 | B | A |
| 144 | SPCC | Example144 | B | B |
| 145 | SPCC | Example145 | S | A |
| 146 | SPCC | Example146 | B | A |
| 147 | SPCC | Example147 | S | A |
| 148 | SPCC | Example148 | S | A |
| 149 | SPCC | Example149 | B | A |
| 150 | SPCC | Example150 | B | A |
| 151 | SPCC | Example151 | S | A |
| 152 | SPCC | Example152 | B | A |
| 153 | SPCC | Example153 | S | A |
| 154 | SPCC | Example154 | S | A |
| 155 | SPCC | Example155 | S | A |
| 156 | SGCC | Example156 | S | A |
| 157 | SPCC | Example157 | A | A |
| 158 | SPCC | Example158 | S | A |
| 159 | SPCC | Example159 | S | A |
| 160 | SPCC | Example160 | S | A |
| 161 | SPCC | Example161 | S | A |
| 162 | SPCC | Example162 | S | A |
| 163 | SPCC | Example163 | S | A |
| 164 | SPCC | Example164 | S | A |
| 165 | SPCC | Example165 | S | A |
| 166 | SPCC | Example166 | S | A |
| 167 | SPCC | Example167 | S | A |
| 168 | SPCC | Example168 | S | A |
| 169 | SPCC | Example169 | S | A |
| 170 | SPCC | Example170 | S | A |
| 171 | SPCC | Example171 | A | A |
| 172 | SPCC | Example172 | S | A |
| 173 | SPCC | Example173 | S | A |
| 174 | SPCC | Example174 | S | A |
| 175 | SPCC | Example175 | A | B |

TABLE 3-3-continued

| Test piece | Steel sheet | Treatment solution | Corrosion resistance | Adhesion performance |
|---|---|---|---|---|
| 176 | SPCC | Example176 | B | A |
| 177 | SPCC | Example177 | B | B |
| 178 | SPCC | Example178 | S | A |
| 179 | SPCC | Example179 | B | A |
| 180 | SPCC | Example180 | S | A |
| 181 | SPCC | Example181 | S | A |
| 182 | SPCC | Example182 | B | A |
| 183 | SPCC | Example183 | B | A |
| 184 | SPCC | Example184 | S | A |
| 185 | SPCC | Example185 | B | A |
| 186 | SPCC | Example186 | S | A |
| 187 | SPCC | Example187 | S | A |
| 188 | SPCC | Example188 | S | A |
| 189 | SGCC | Example189 | S | A |
| 190 | SPCC | Example190 | A | A |
| 191 | SPCC | Example191 | S | A |
| 192 | SPCC | Example192 | S | A |
| 193 | SPCC | Example193 | S | A |
| 194 | SPCC | Example194 | S | A |
| 195 | SPCC | Example195 | S | A |
| 196 | SPCC | Example196 | S | A |
| 197 | SPCC | Example197 | S | A |
| 198 | SPCC | Example198 | S | A |

TABLE 3-4

| Test piece | Steel sheet | Treatment solution | Corrosion resistance | Adhesion performance |
|---|---|---|---|---|
| 199 | SPCC | Example199 | S | A |
| 200 | SPCC | Example200 | S | A |
| 201 | SPCC | Example201 | S | A |
| 202 | SPCC | Example202 | S | A |
| 203 | SPCC | Example203 | S | A |
| 204 | SPCC | Example204 | A | A |
| 205 | SPCC | Example205 | S | A |
| 206 | SPCC | Example206 | S | A |
| 207 | SPCC | Example207 | S | A |
| 208 | SPCC | Example208 | A | B |
| 209 | SPCC | Example209 | B | A |
| 210 | SPCC | Example210 | B | B |
| 211 | SPCC | Example211 | S | A |
| 212 | SPCC | Example212 | B | A |
| 213 | SPCC | Example213 | S | A |
| 214 | SPCC | Example214 | S | A |
| 215 | SPCC | Example215 | B | A |
| 216 | SPCC | Example216 | B | A |
| 217 | SPCC | Example217 | S | A |
| 218 | SPCC | Example218 | B | A |
| 219 | SPCC | Example219 | S | A |
| 220 | SPCC | Example220 | S | A |
| 221 | SPCC | Example221 | S | A |
| 222 | SGCC | Example222 | S | A |
| 223 | SPCC | Example223 | A | A |
| 224 | SPCC | Example224 | S | A |
| 225 | SPCC | Example225 | S | A |
| 226 | SPCC | Example226 | S | A |
| 227 | SPCC | Example227 | S | A |
| 228 | SPCC | Example228 | S | A |
| 229 | SPCC | Example229 | S | A |
| 230 | SPCC | Example230 | S | A |
| 231 | SPCC | Example231 | S | A |
| 232 | SPCC | Example232 | S | A |
| 233 | SPCC | Example233 | S | A |
| 234 | SPCC | Example234 | S | A |
| 235 | SPCC | Example235 | S | A |
| 236 | SPCC | Example236 | S | A |
| 237 | SPCC | Example237 | A | A |
| 238 | SPCC | Example238 | S | A |
| 239 | SPCC | Example239 | S | A |
| 240 | SPCC | Example240 | S | A |
| 241 | SPCC | Example241 | A | B |
| 242 | SPCC | Example242 | B | A |
| 243 | SPCC | Example243 | B | B |

TABLE 3-4-continued

| Test piece | Steel sheet | Treatment solution | Corrosion resistance | Adhesion performance |
|---|---|---|---|---|
| 244 | SPCC | Example244 | S | A |
| 245 | SPCC | Example245 | B | A |
| 246 | SPCC | Example246 | S | A |
| 247 | SPCC | Example247 | S | A |
| 248 | SPCC | Example248 | B | A |
| 249 | SPCC | Example249 | B | A |
| 250 | SPCC | Example250 | S | A |
| 251 | SPCC | Example251 | B | A |
| 252 | SPCC | Example252 | S | A |
| 253 | SPCC | Example253 | S | A |
| 254 | SPCC | Example254 | S | A |
| 255 | SGCC | Example255 | S | A |
| 256 | SPCC | Example256 | A | A |
| 257 | SPCC | Example257 | S | A |
| 258 | SPCC | Example258 | S | A |
| 259 | SPCC | Example259 | S | A |
| 260 | SPCC | Example260 | S | A |
| 261 | SPCC | Example261 | S | A |
| 262 | SPCC | Example262 | S | A |
| 263 | SPCC | Example263 | S | A |
| 264 | SPCC | Example264 | S | A |

TABLE 3-5

| Test piece | Steel sheet | Treatment solution | Corrosion resistance | Adhesion performance |
|---|---|---|---|---|
| 265 | SPCC | Comparative Example1 | C | C |
| 266 | SPCC | Comparative Example2 | C | C |
| 267 | SPCC | Comparative Example3 | C | B |
| 268 | SPCC | Comparative Example4 | C | A |
| 269 | SPCC | Comparative Example5 | C | B |
| 270 | SPCC | Comparative Example6 | C | A |
| 271 | SPCC | Comparative Example7 | C | C |
| 272 | SPCC | Comparative Example8 | C | C |
| 273 | SPCC | Comparative Example9 | C | C |
| 274 | SGCC | Comparative Example10 | C | C |

The present invention has been described in detail referring to concrete embodiments and examples thereof; however, it is obvious to those skilled in the art that various modifications and changes can be made without departing from the gist and the scope of the present invention.

The invention claimed is:

1. A metal surface treatment agent, comprising:
an ion (A) comprising at least one kind of metal selected from zirconium, titanium, and hafnium at a metal-equivalent molar concentration of 0.1 mmol/L or higher; and
an aqueous urethane resin (B) having a weight-average molecular weight of 100,000 or higher at a solid mass concentration of 0.5 g/L to 10 g/L,
wherein a ratio of a solid mass ($B_M$) of the resin (B) to a metal-equivalent mass ($A_M$) of the ion (A), [$B_M/A_M$] is 0.7 or higher.

2. The metal surface treatment agent according to claim 1, further comprising at least one kind of metal (C) selected from aluminum, magnesium, zinc, and iron.

3. The metal surface treatment agent according to claim 1, further comprising at least one kind of acid radical (E) selected from a nitric acid radical, a sulfuric acid radical, a formic acid radical, an acetic acid radical, and an alkanesulfonic acid radical.

4. A metal surface treatment method, comprising a step of bringing the metal surface treatment agent according to claim 1 into contact with a metal surface.

5. A metal material, having a surface treatment coating layer formed on/over a surface of the metal material by the surface treatment method according to claim 4.

* * * * *